(12) United States Patent
Gobinath et al.

(10) Patent No.: US 9,056,533 B2
(45) Date of Patent: Jun. 16, 2015

(54) PERISTALTIC TUBE AIR MAINTENANCE TIRE ASSEMBLY AND METHOD

(75) Inventors: Thulasiram Gobinath, Hudson, OH (US); Robert Leon Benedict, Tallmadge, OH (US); Robin Lamgaday, Norton, OH (US); Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 457 days.

(21) Appl. No.: 13/470,525

(22) Filed: May 14, 2012

(65) Prior Publication Data

US 2013/0299055 A1 Nov. 14, 2013

(51) Int. Cl.
*B60C 23/12* (2006.01)

(52) U.S. Cl.
CPC ...................................... *B60C 23/12* (2013.01)

(58) Field of Classification Search
CPC ........ B60C 23/004; B60C 23/10; B60C 23/12
USPC .......................................... 152/419, 423–426
See application file for complete search history.

(56) References Cited

U.S. PATENT DOCUMENTS

| | | | |
|---|---|---|---|
| 1,050,886 A | 1/1913 | Wetherell | |
| 1,134,361 A | 4/1915 | Wetherell | |
| 3,304,981 A | 2/1967 | Sheppard | 152/426 |
| 3,833,041 A | 9/1974 | Glad et al. | 152/347 |
| 3,867,973 A | 2/1975 | Cozzolino et al. | 152/153 |
| 4,922,984 A | 5/1990 | Dosjoub et al. | 152/415 |
| 5,052,456 A | 10/1991 | Dosjoub | 152/415 |
| 7,117,731 B2 | 10/2006 | Hrabal | 73/146 |
| 7,225,845 B2 | 6/2007 | Ellmann | 152/426 |
| 8,042,586 B2 | 10/2011 | Losey et al. | 152/426 |
| 8,235,081 B2 * | 8/2012 | Delgado et al. | 152/419 |
| 8,381,784 B2 * | 2/2013 | Delgado | 152/419 |
| 8,695,661 B2 * | 4/2014 | Delgado et al. | 152/419 |
| 2009/0294006 A1 | 12/2009 | Hrabal | 152/426 |
| 2011/0272073 A1 | 11/2011 | Losey | 152/340.1 |

FOREIGN PATENT DOCUMENTS

| | | | | |
|---|---|---|---|---|
| DE | 3433318 | 3/1986 | | B60C 23/12 |
| EP | 2338703 | 6/2011 | | B60C 23/00 |
| EP | 2578420 | 4/2013 | | B60C 23/12 |
| RU | 2106978 | 3/1998 | | B60C 23/12 |
| WO | 03/049958 | 6/2003 | | B60C 23/12 |
| WO | 2005/012009 | 2/2005 | | B60C 23/00 |
| WO | 2007/134556 | 11/2007 | | B60C 23/00 |
| WO | 2010-008338 | 1/2010 | | B60C 23/12 |

OTHER PUBLICATIONS

European Search Report received by Applicants Aug. 23, 2013.

* cited by examiner

*Primary Examiner* — Jason Bellinger
(74) *Attorney, Agent, or Firm* — Richard B. O'Planick

(57) ABSTRACT

An elongate air tube is positioned within a tire sidewall cavity in contacting internal engagement with the tire sidewall to form an assembly. The air tube includes an internal elongate air passageway and wing projections projecting in opposite directions at an axially inward body portion. The wing projections seat within cavity pockets to retain the air tube within the cavity. The air tube body operatively compresses responsive to impinging stress forces from the tire sidewall against the air tube body, whereby the air tube body reconfiguring from an expanded unstressed configuration into a compressed configuration to constrict the air passageway. The air tube body decompresses into the expanded configuration upon reduction of the impinging stress forces against the air tube body.

11 Claims, 32 Drawing Sheets

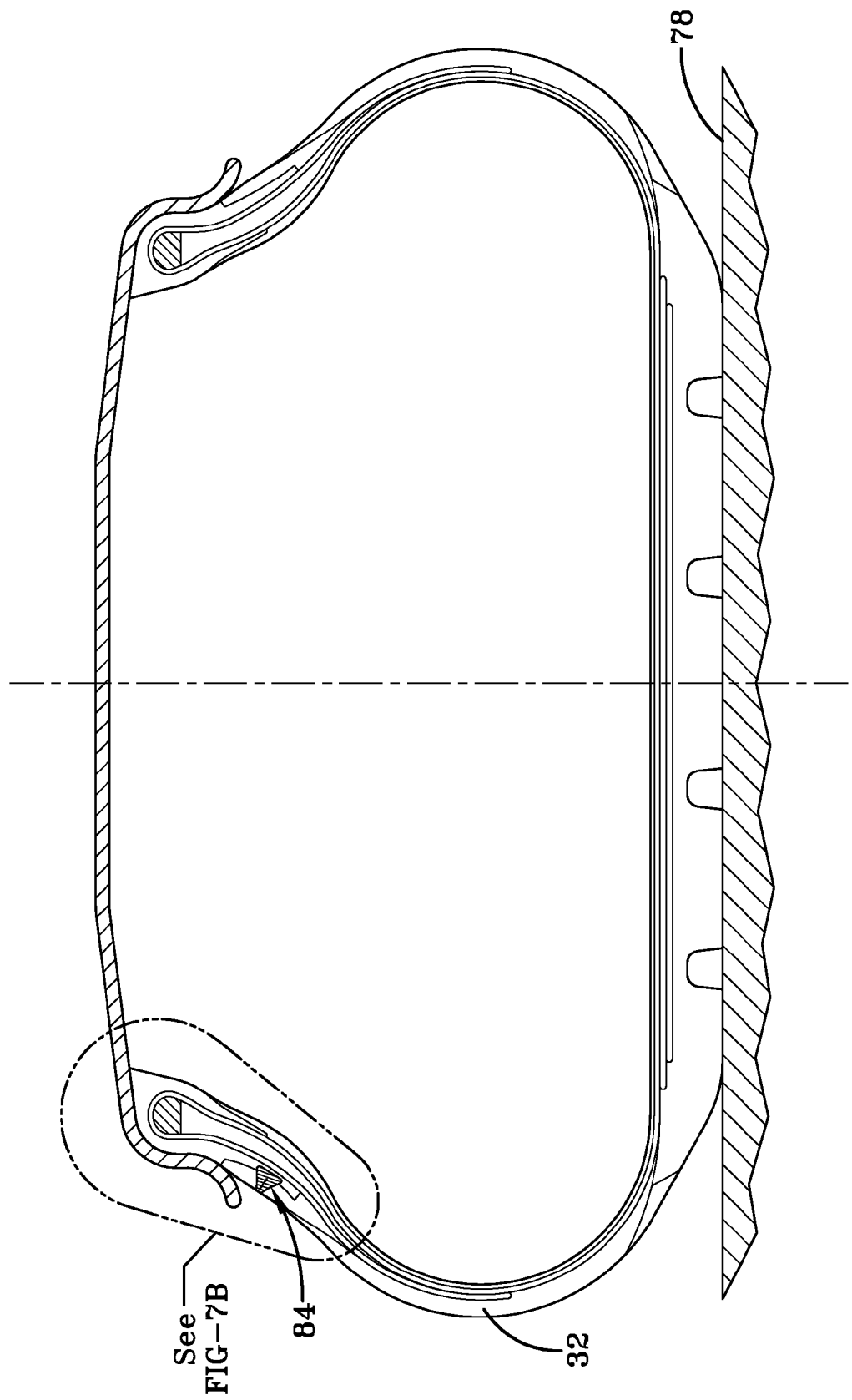

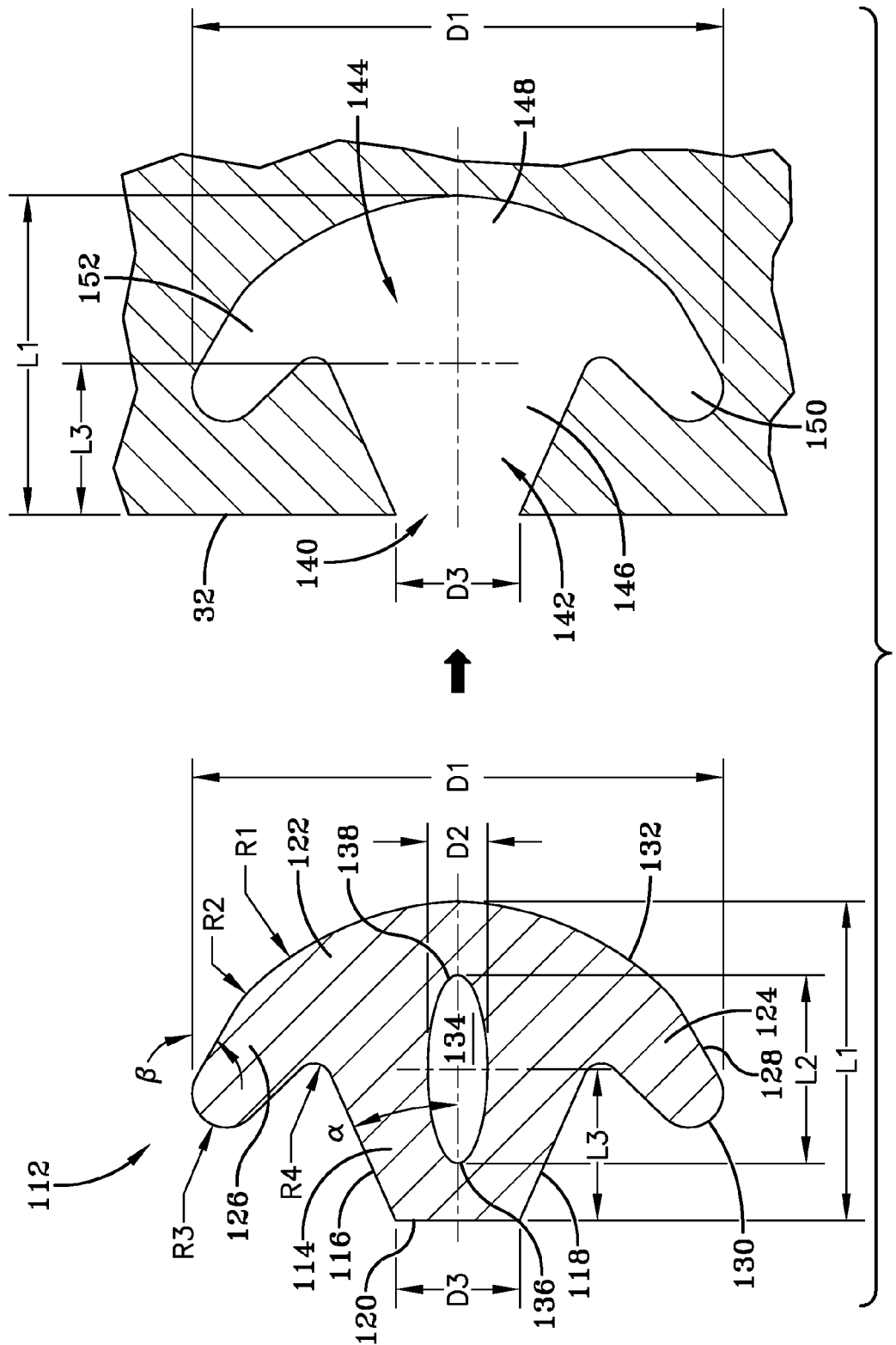

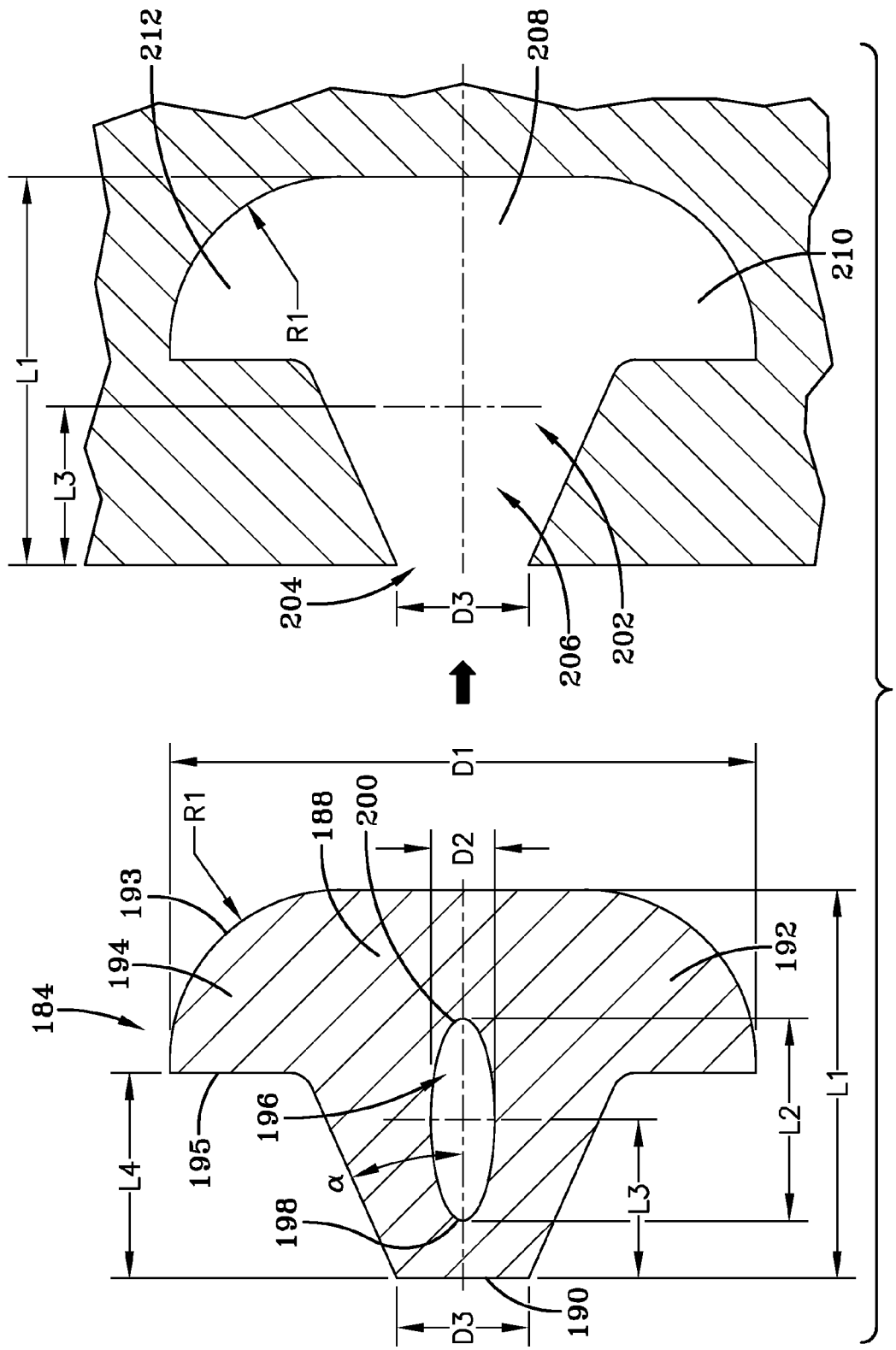

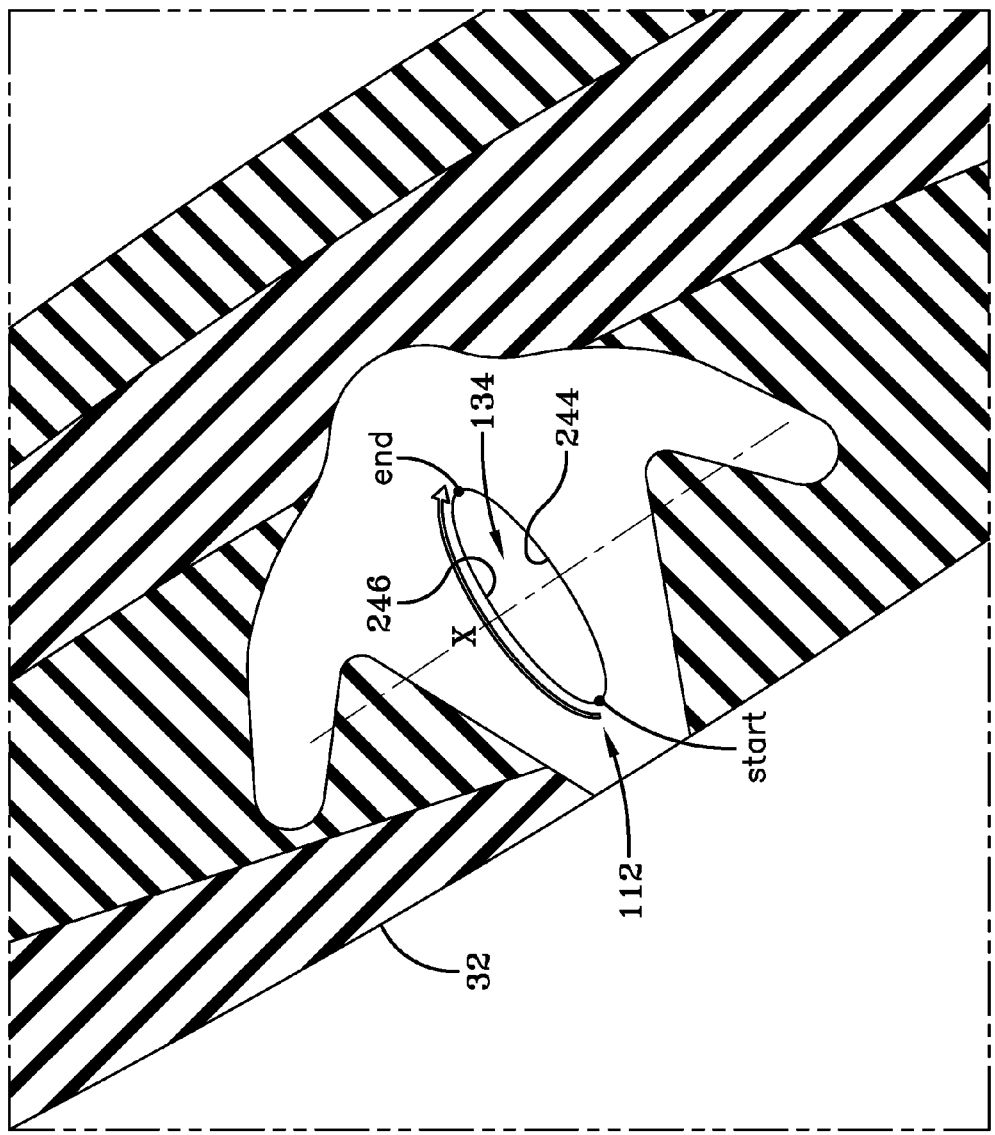

PERISTALTIC TUBE AIR MAINTENANCE TIRE ASSEMBLY AND METHOD

FIELD OF THE INVENTION

The invention relates generally to air maintenance tires and, more specifically, to an air maintenance tire and pumping tube assembly therefore.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will re-inflate the tire in order to compensate for any reduction in tire pressure over time without the need for driver intervention.

SUMMARY OF THE INVENTION

In one aspect of the invention, an elongate air tube is positioned within a tire sidewall cavity in contacting internal engagement with internal surfaces of the tire sidewall to form an assembly. The air tube includes a unitary air tube body and an internal preferably elliptical air passageway centrally positioned within the air tube body. The air tube body has wing projections projecting in opposite directions from an axially inward air tube body portion. The wing projections fold to accommodate insertion of the air tube body into the tire sidewall cavity and expand into cavity pockets once inserted to retain the air tube within the cavity. The air tube body operatively compresses responsive to impinging stress forces from the tire sidewall against the air tube body whereby the air tube body reconfiguring from an expanded unstressed configuration into a compressed configuration to constrict the air passageway. The air tube body decompresses into the expanded configuration upon reduction of the impinging stress forces against the air tube body.

In another aspect of the invention, a method of reconfiguring an air tube body within a tire sidewall includes: assembling the elongate air tube described above within a tire sidewall cavity in contacting internal engagement with contact surfaces of the tire sidewall, registering the wing projections into axially inward complementary pockets of the sidewall cavity to retain the tube within the sidewall cavity; flexing the tire sidewall to impinge stress forces from the sidewall contact surfaces on the air tube body; forcibly compressing the air tube body and collapsing the air passageway into a closed configuration.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 7A is a transverse section view through the tire and peristaltic tube assembly with the tube in a collapsed configuration.

FIG. 11A is an enlarged exploded sectional view of the first alternative tube embodiment and host sidewall groove.

FIG. 16A is an enlarged exploded sectional view of the third alternative tube embodiment and host sidewall groove.

FIG. 20 is a sectional schematic view of a peristaltic tube within a tire sidewall and showing the distance X used to graph against the contact force normal (CFNOR) for the tube embodiments.

DETAILED DESCRIPTION OF THE INVENTION

Figure 1:
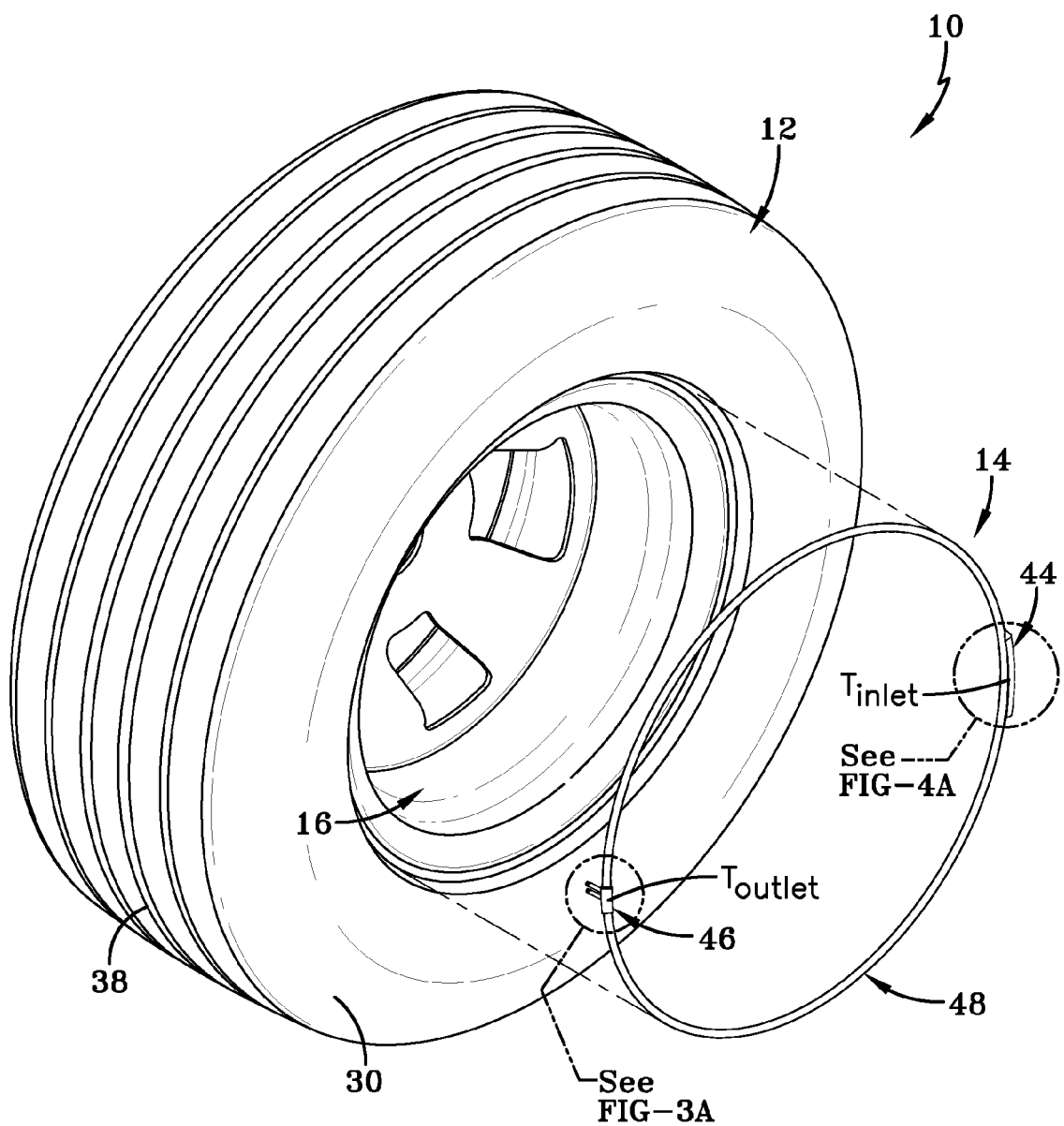
FIG. 1 is an exploded isometric view of a tire, rim, and peristaltic tube assembly.
Figure 2:
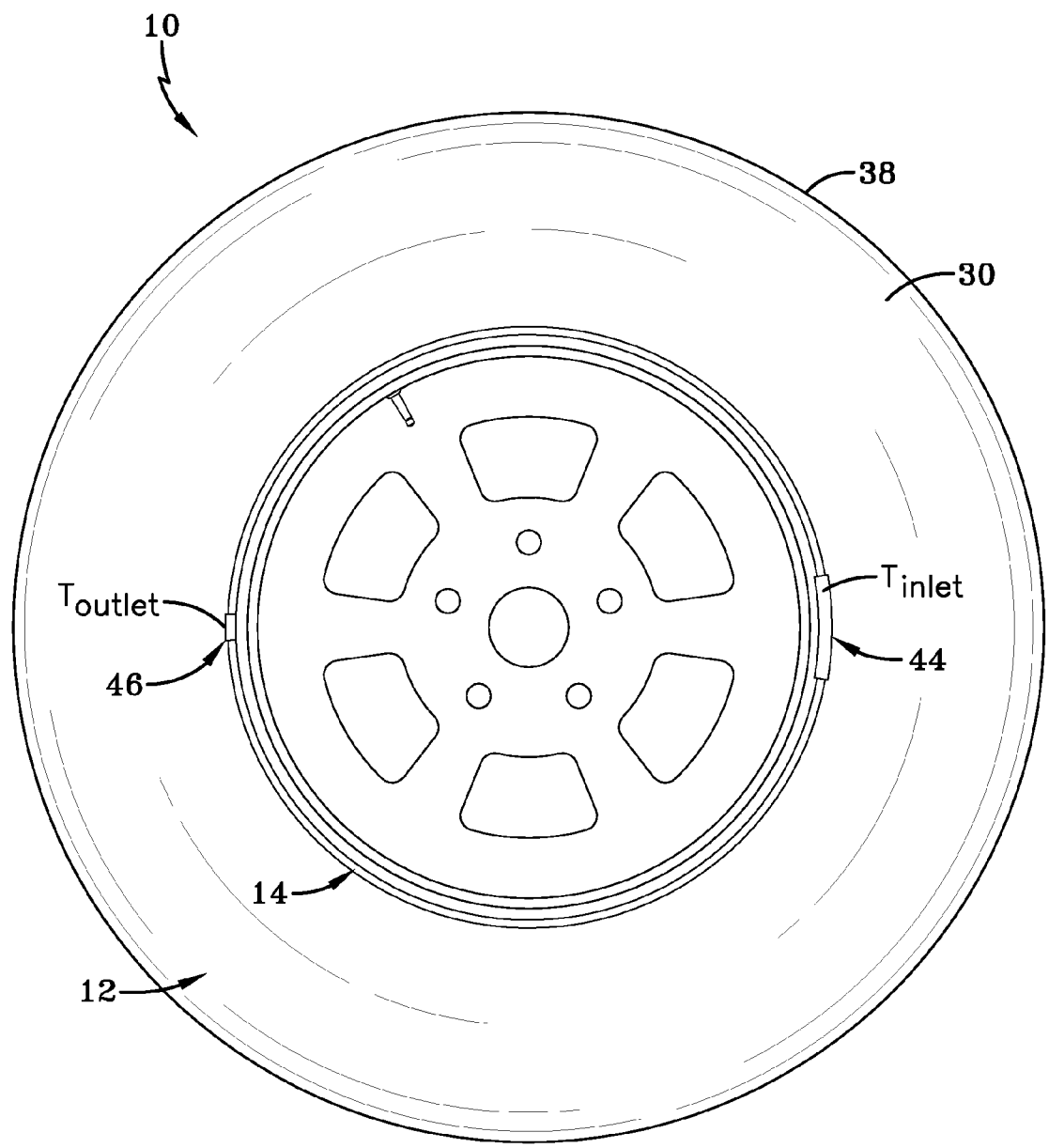
FIG. 2 is a side view of the tire with the peristaltic tube assembly within a tire sidewall.
Figure 6A:
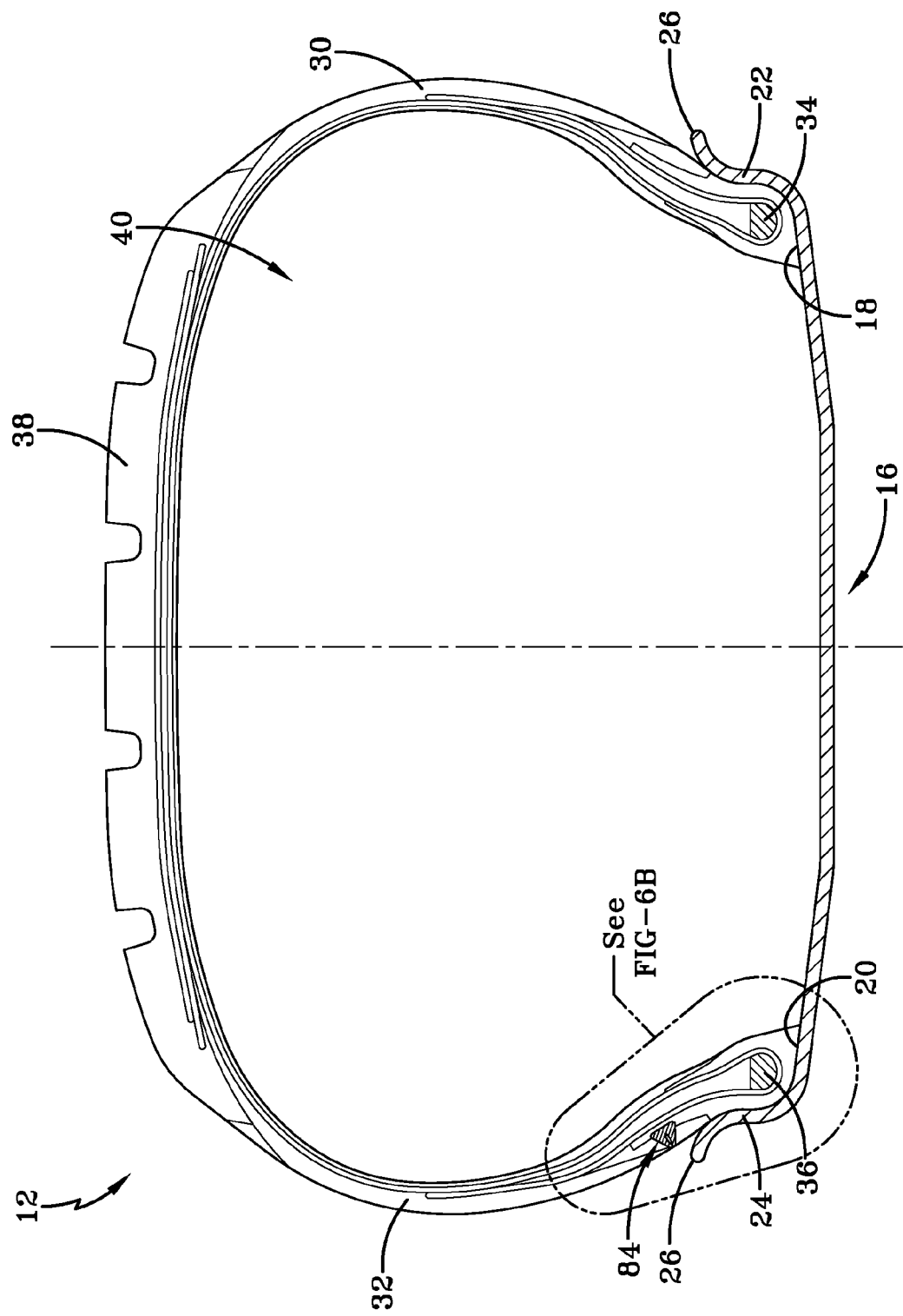
FIG. 6A is a transverse section view through the tire and non-collapsed peristaltic tube assembly.

Referring to FIGS. 1, 2, and 6A, a tire assembly 10 includes a tire 12, a peristaltic pump assembly 14, and a tire rim 16. The tire mounts in conventional fashion to a pair of rim mounting surfaces 18, 20 adjacent outer rim flanges 22, 24. The rim flanges 22, 24, each have a radially outward facing flange end 26. The tire is of conventional construction, having a pair of sidewalls 30, 32 extending from opposite bead areas 34, 36 to a crown or tire tread region 38. The tire and rim enclose a tire cavity 40.

As seen from FIGS. 1, 2, 3A through 3C, 4A through C, 5A and 5B, the peristaltic pump assembly 14 includes an annular air tube 48 that encloses an annular passageway 42. While shown to configure an annular body, the air tube 48 may alternatively configured into other geometric shapes if desired. The tube 48 is formed of a resilient, flexible material such as plastic or rubber compounds that are capable of withstanding repeated deformation cycles wherein the tube is deformed into a flattened condition subject to external force and, upon removal of such force, returns to an original condition. The tube passageway 42 is generally circular in section and is of a diameter sufficient to operatively pass a volume of air sufficient for the purposes described herein and allowing a positioning of the tube in an operable location within the tire assembly as will be described. In the configuration shown, the tube 48 is elongate and circular. An elongate groove of complementary shape to the tube 48 is formed to extend into an axially outward surface of a sidewall such as sidewall 30, preferably in the geometric form of an annular ring. The other sidewall may be grooved or both sidewalls if so desired. The groove has an internal sectional profile complementary with the external geometry of the tube 48. The groove complementary internal geometry accommodates close receipt of the tube 48. FIGS. 1 and 2 represent a prior art configuration of tube and groove, and are disclosed in detail in U.S. Pat. No.

8,042,586 B2, issued Oct. 25, 2011 entitled: "Self-Inflating Tire Assembly", incorporated herein in its entirety by reference.

Figure 3B:
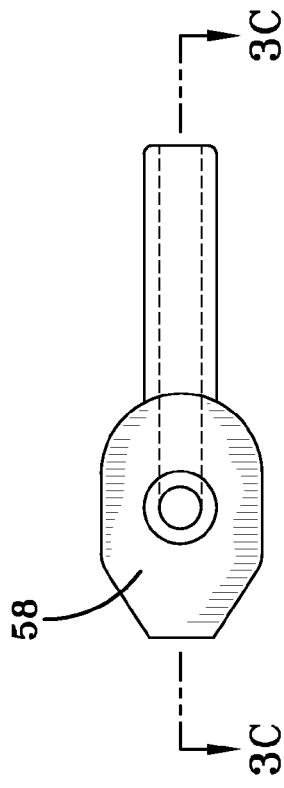
FIG. 3B is a plan view of the outlet device.
Figure 3C:
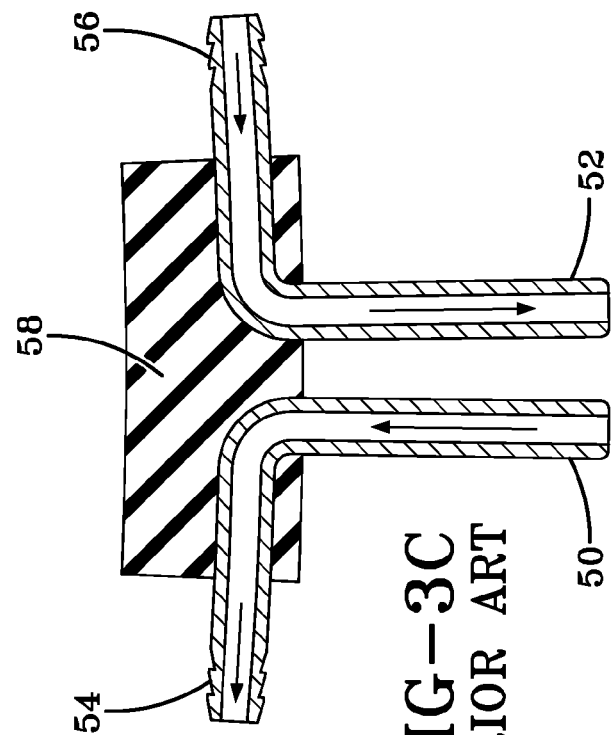
FIG. 3C is a section view through the outlet device taken along the line 3C-3C of FIG. 3B.
Figure 3A:
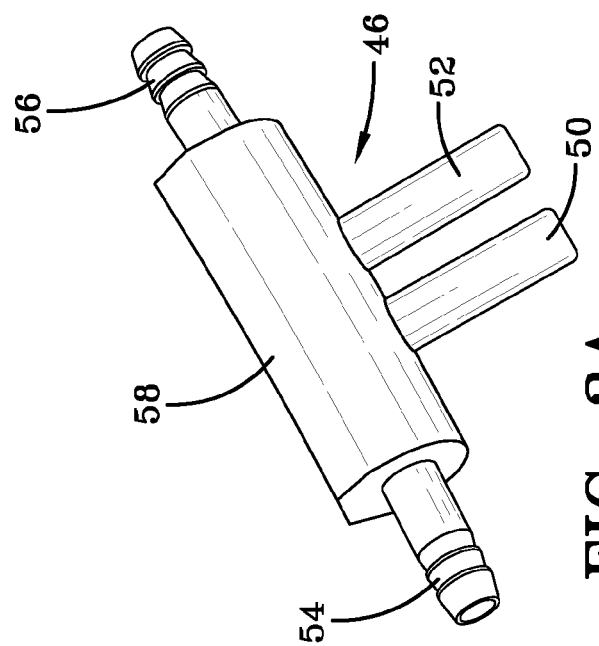
FIG. 3A is an isometric view of an outlet device component showing of the tube assembly.
Figure 4A:
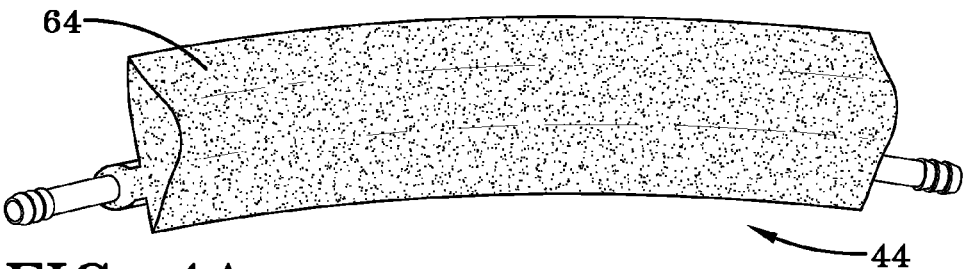
FIG. 4A is an isometric view of an inlet device component of the tube assembly.
Figure 4B:
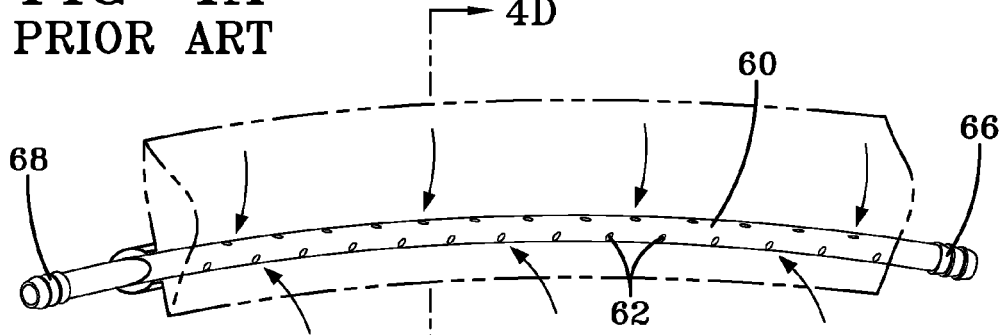
FIG. 4B is an isometric view of the inlet device with the filter sleeve in phantom.
Figure 4C:
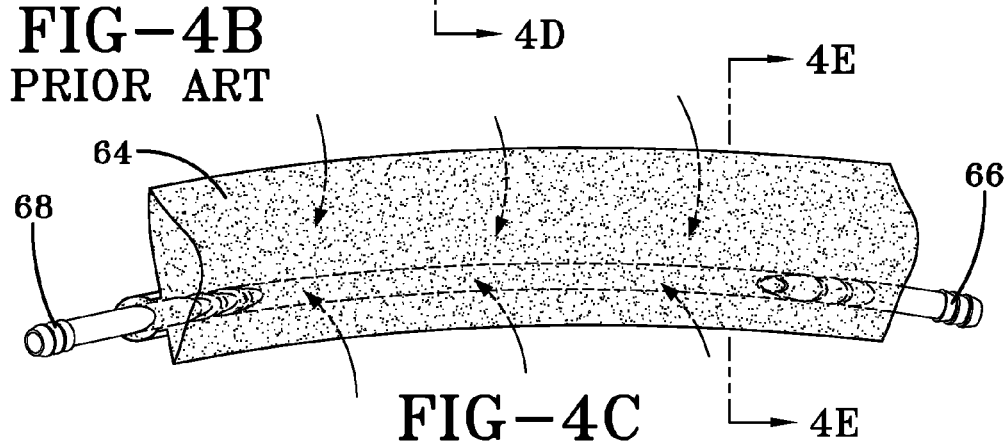
FIG. 4C is an isometric view of the inlet device component showing air intake schematically and the tube of the device in phantom.
Figure 4D:
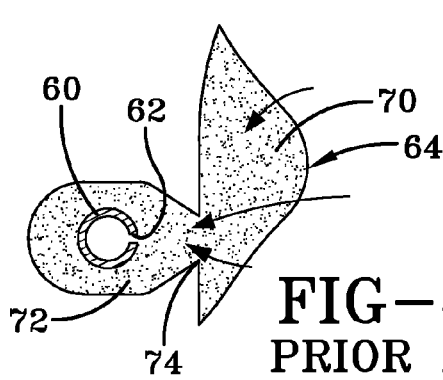
FIG. 4D is a sectional view through the inlet device taken along the line 4D-4D of FIG. 4B.
Figure 4E:
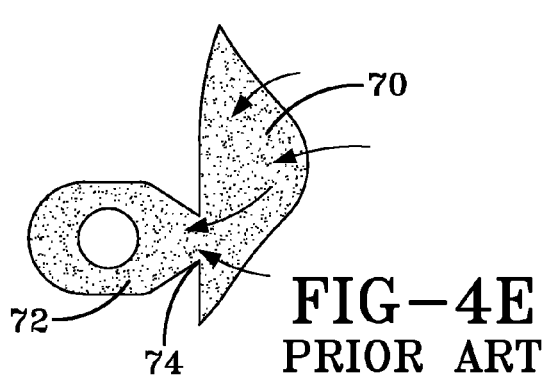
FIG. 4E is a section view through the inlet device taken along the line 4E-4E of FIG. 4C.

With reference to FIGS. 1, 2, 3A through 3C and 4A through E, the peristaltic pump assembly 14 further includes an inlet device 44 and an outlet device 46 spaced apart approximately 180 degrees at respective locations along the circumferential air tube 48. The outlet device 46, as shown in FIGS. 3A through 3C, has a T-shaped configuration in which conduits 50, 52 direct air to and from the tire cavity 40. An outlet device housing block 58 contains conduit arm ends 54, 56 that integrally extend at right angles from respective conduits 50,52. The housing 58 is formed having an external geometry that complements and resides within the groove within the sidewall.

The inlet device 44 as seen in FIGS. 1, 2 and 4A through 4E includes an elongate outward porous filtering sleeve 64 encasing an internal intake tube 60. Ends 66, 68 of the tube 60 protrude from the sleeve 64 the tube 60 is configured having multiple air intake through-holes 62. The outward sleeve 64 has an external geometry including a tubular inward air passage body 72 and an axially outward lobe body 70 operationally abutting against an outward surface of the tire sidewall and connecting to the body 72 by a neck junction 74. Air intake indicated as shown enters through the porous filtering sleeve 64 and the apertures 62 into the intake tube 60. Ends 66, 68 of the intake tube 60 are attached to the air tube 48 and reside therewith within the sidewall groove. So located, the tube 60 directs intake air into the tube 48 for pumping into the tire cavity.

As will be appreciated from FIGS. 1, 2, 6A, 6B, 7A and 7B, the pump assembly 14 comprises the air tube 42 and an inlet and an outlet device 44, 46. Devices 44, 46 are affixed in-line to the air tube 42 at respective locations 180 degrees apart. The pumping assembly 14 is thus inserted into the sidewall groove located at a lower sidewall region of the tire. With the tire 12 mounted to the rim 16, the air tube 42 within the tire is located above the rim flange ends 26

With continued reference to Referring to FIGS. 1, 2, 5A and 5B, the tire 12, with the tube 42 positioned within a sidewall groove, rotates in a direction of rotation 76 against ground surface 78. A compressive force 80 is directed into the tire at the tire footprint and acts to flatten a segment of the air tube passageway 42 opposite the footprint. Flattening of the segment of the passageway 42 forces air from the segment along tube passageway 42 in the direction shown by arrow 82 toward the outlet device 46.

As the tire continues to rotate in direction 76 along the ground surface 78, the tube 48 will be sequentially flattened or squeezed opposite the tire footprint segment by segment in a direction opposite to the direction of tire rotation. A sequential flattening of the tube passageway 42 segment by segment will result and cause evacuated air from the flattened segments to be pumped in the direction 82 within tube passageway 42 to the outlet device 46 and from the outlet device 46 to the tire cavity as shown. A valve system to regulate the flow of air to the cavity when the air pressure within the cavity falls to a prescribed level is shown and described in pending U.S. Patent Publication No. 2011/0272073, and incorporated herein by reference.

Figure 5A:
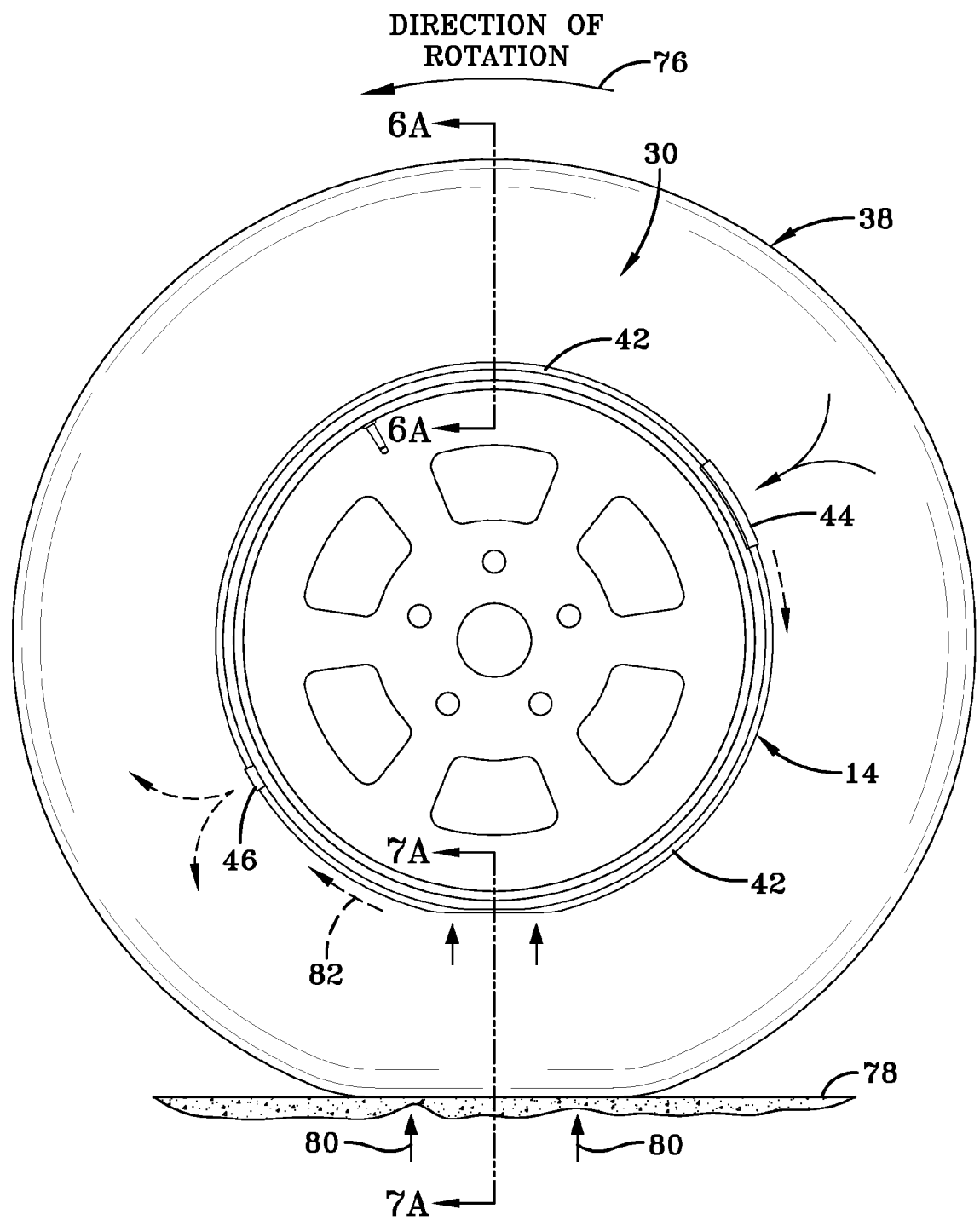
FIG. 5A is a side elevation view of the tire and peristaltic tube assembly shown schematically rotating against a road surface.
Figure 5B:
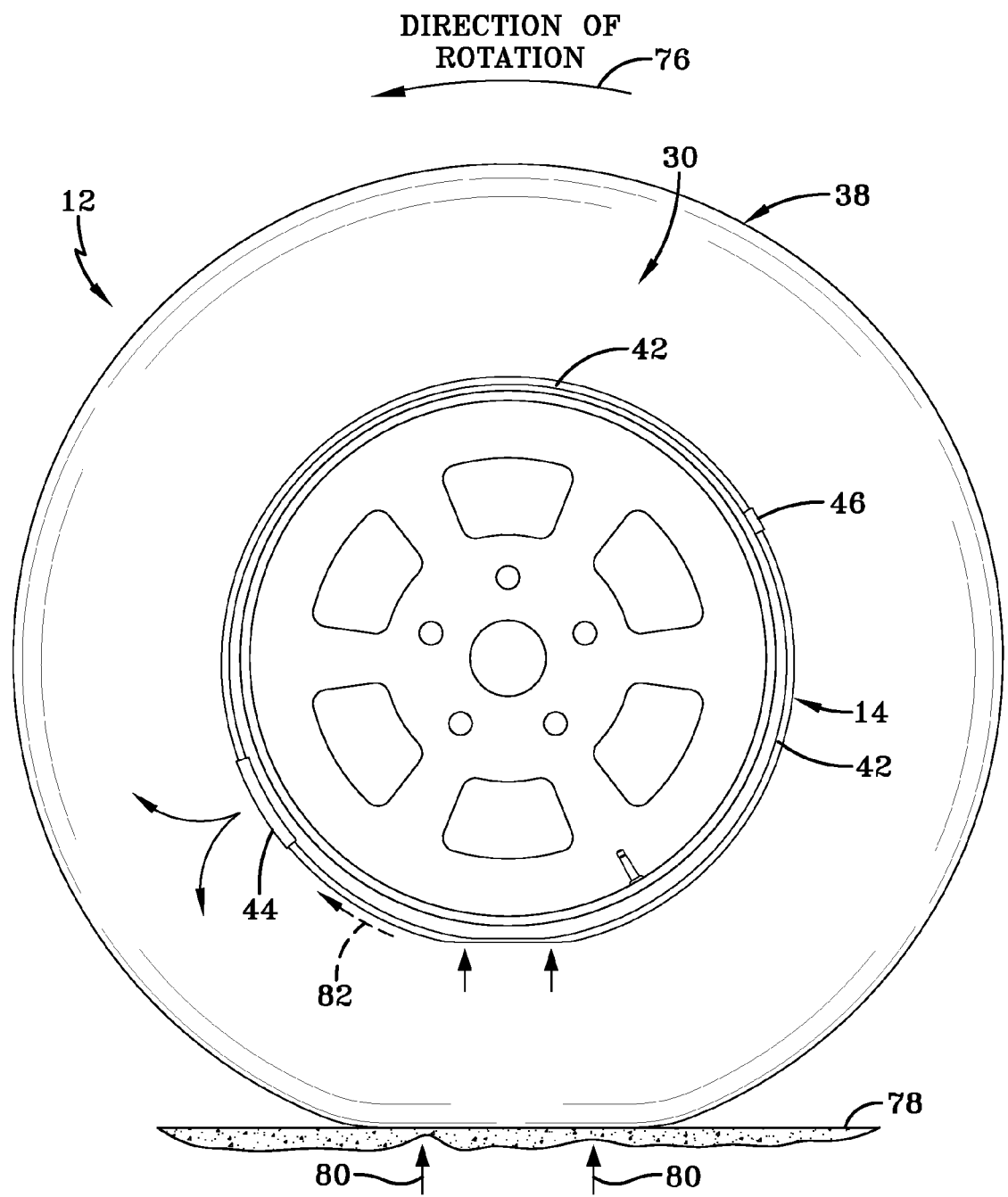
FIG. 5B is a side elevation view of the tire and peristaltic tube assembly shown sequentially subsequent to the position of FIG. 5A.

With the tire rotating in direction 76, flattened tube segments are sequentially refilled by air flowing into the inlet device 44 as shown at 84 in FIG. 5A. The inflow of air into the inlet device 44 flows into the tube passageway 42 and continues until the outlet device 46, rotating counterclockwise as shown with the tire rotation, passes the tire footprint. FIG. 5B shows the orientation of the peristaltic pump assembly 14 in such a position. In the position shown, the tube 42 continues to be sequentially flattened segment by segment opposite the tire footprint by compressive force 80. Air is pumped in the clockwise direction 82 to the inlet device 44 where it is evacuated or exhausted outside of the tire. When the tire rotates further in counterclockwise direction 76,1 the inlet device 44 eventually passes the tire footprint (as shown in FIG. 5A), and the airflow resumes to the outlet device 46. Pumped air resumes its flow out and into the tire cavity 40. Air pressure within the tire cavity is thus maintained at a desired level.

The above-described cycle is then repeated for each tire revolution, half of each rotation resulting in pumped air going to the tire cavity and half of the rotation the pumped air is directed back out the inlet device 44. It will be appreciated that while the direction of rotation 76 of the tire 12 is as shown in FIGS. 5A and 5B to be counterclockwise, the subject tire assembly and its peristaltic pump assembly 14 will function in like manner in a (clockwise) reverse direction of rotation as well. The peristaltic pump is accordingly bi-directional and equally functional with the tire assembly moving in a forward or a reverse direction of rotation.

Figure 6B:
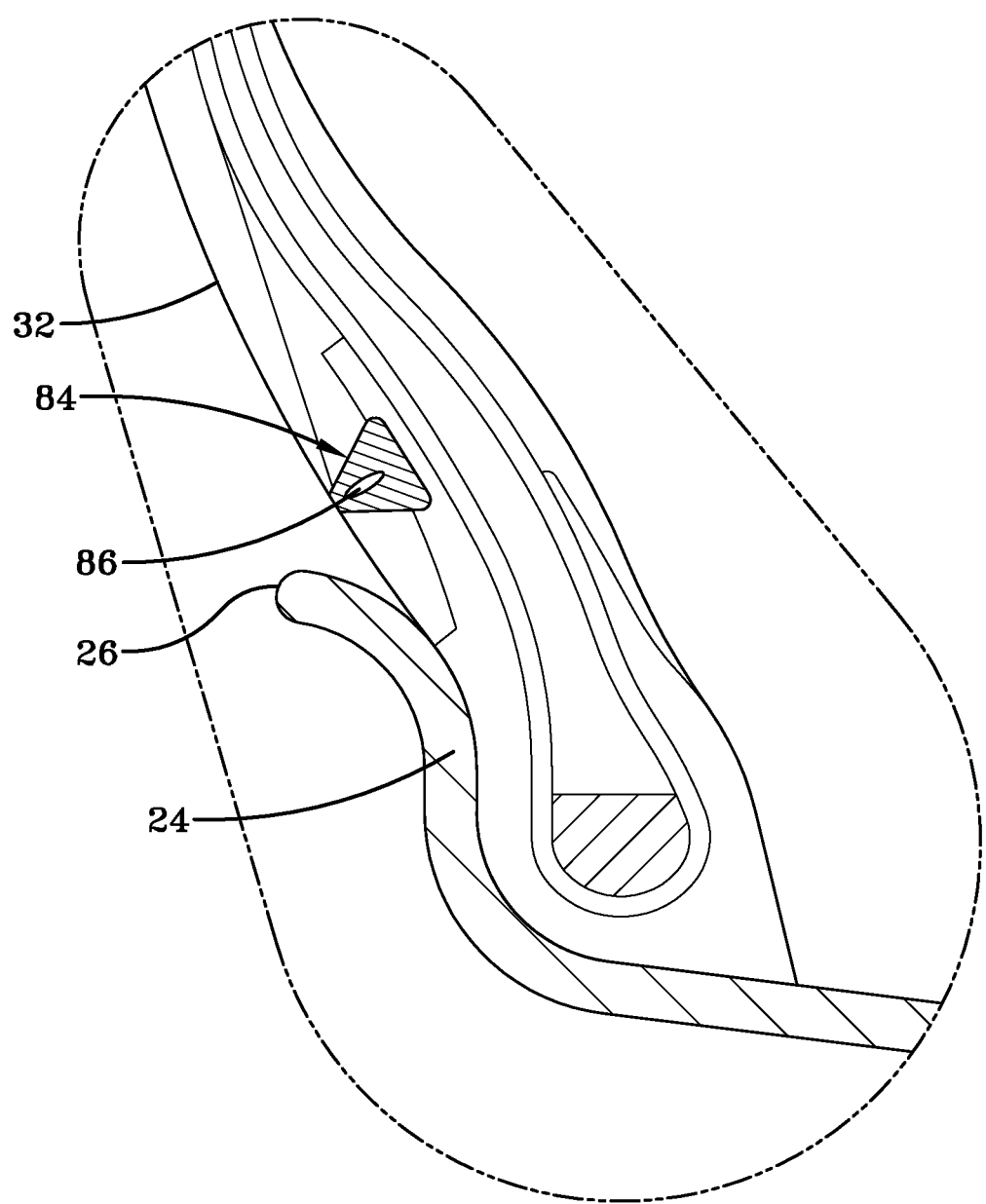
FIG. 6B is an enlarged section view of the portion of the tire bead region, rim, and a non-collapsed peristaltic tube segment as identified in FIG. 6A.

Referring to FIGS. 6A, 6B; 7A, 7B; 8A and 8B, a "side-taper" tube configuration in a first embodiment is shown having a generally truncated wedge shaped cross-section. As used herein, "wedge" refers to the outboard portion of a tube that inserts into a tire sidewall groove. The wedge portion widens from an outer end at the tire sidewall groove entry toward an inner end of the tube positioned at the inward end of the groove. The portion referred to as "wedge portion" of a tube, in the described embodiments, accordingly is referencing the outboard side or portion of the tube that extends within a groove from a tire sidewall groove entry inward. As used herein, "cap portion" refers broadly to the portion of a tube at an inboard side or portion of the tube located at a the inward extremity of a host tire sidewall groove. As used herein, "wing protrusions" refer to laterally projecting portions of a tube body that extend outward from a main tube body and which, when the tube body is seated into its host tire sidewall groove, fit within ancillary groove chambers. The tube 84 is configured having an internal elliptical air passageway 86 in which a longitudinal axis of passageway 86 is oriented transversely through the tube. The air tube 84 has a forward wedge portion or region 88 of smaller diameter and an inboard larger diameter inboard end region 90. The body of air tube 84 has a flat end surface 92 and divergent angled sides 94, 96 extending along the air tube from the small-diameter region 88 to the larger diameter inboard end 90, terminating at rounded corners 100, 101 at an inboard end surface 98. The wedge-shaped air tube 84 has preferred dimensions within the ranges specified below. The preferred dimensions are in millimeters:

D1: 6.46+/−0.1 mm;
D2: 0.7+/−0.01 mm;
D3: 1.46+/−0.05 mm;
L1: 4.25 mm;
L2: 2.2+/−0.1 mm;
L3: 1.78+/−0.01 mm;
α: 30.48 degrees
R1: 0.5 mm.

The groove chamber 110 within a sidewall 30 that receives the tube 84 has an internal configuration and geometry generally complimenting the geometry of tube 84. The groove chamber 110 includes a narrow opening 102 at the outer surface of sidewall 30; a wedge shaped internal groove configuration extending from a smaller diameter entry region 104 and widening gradually along angled sides to a wider inboard groove chamber portion terminating at rounded groove inboard corner pockets or regions 106, 108. The preferred dimensions of the groove components are as tabulated above and complement corresponding component dimensions of the tube.

Insertion of the tube 84 into the groove 110 is accomplished by compressing the tube into a flat enough dimension to fit within and through the opening 102. Once situated within the groove chamber 110, the tube 84 resiliently resumes its original form and fills the void of the groove chamber 110. The radius corners 100, 101 of the tube are received within the respective radius pockets or corners 108, 106 of the groove. The corners 100, 101 so situated represent wing projections of the tube, located geometrically proximate the wider end of the tube, the wing projections residing within respective complementary configured regions of the groove chamber 110 at the axially inward, wider, groove chamber region. So located, the wing projections 100, 101 operationally resist lateral withdrawal of the air tube body from the groove chamber. The wider corners 100, 101 thus serve to retain the tube within the groove chamber without interfering or degrading the tube's capability of performing its primary intended function as an air pumping device through cyclical segment by segment collapsing and expansion of the tube in a rolling tire footprint. The tube 84 is retained within the groove chamber but can still react to the stresses imposed from flexure of the tire sidewall 30 to collapse segment by segment along the air passageway 86 to thereby pump air along the passageway and into the tire cavity.

FIG. 6A is a transverse section view through a tire and FIG. 6B an enlarged view showing the tube 84 situated within a sidewall groove in a non-collapsed condition. The segment of the sidewall 32 shown is outside of the tire footprint and, therefore, is not impinging stress forces of the tube to collapse the tube passageway.

Figure 7B:
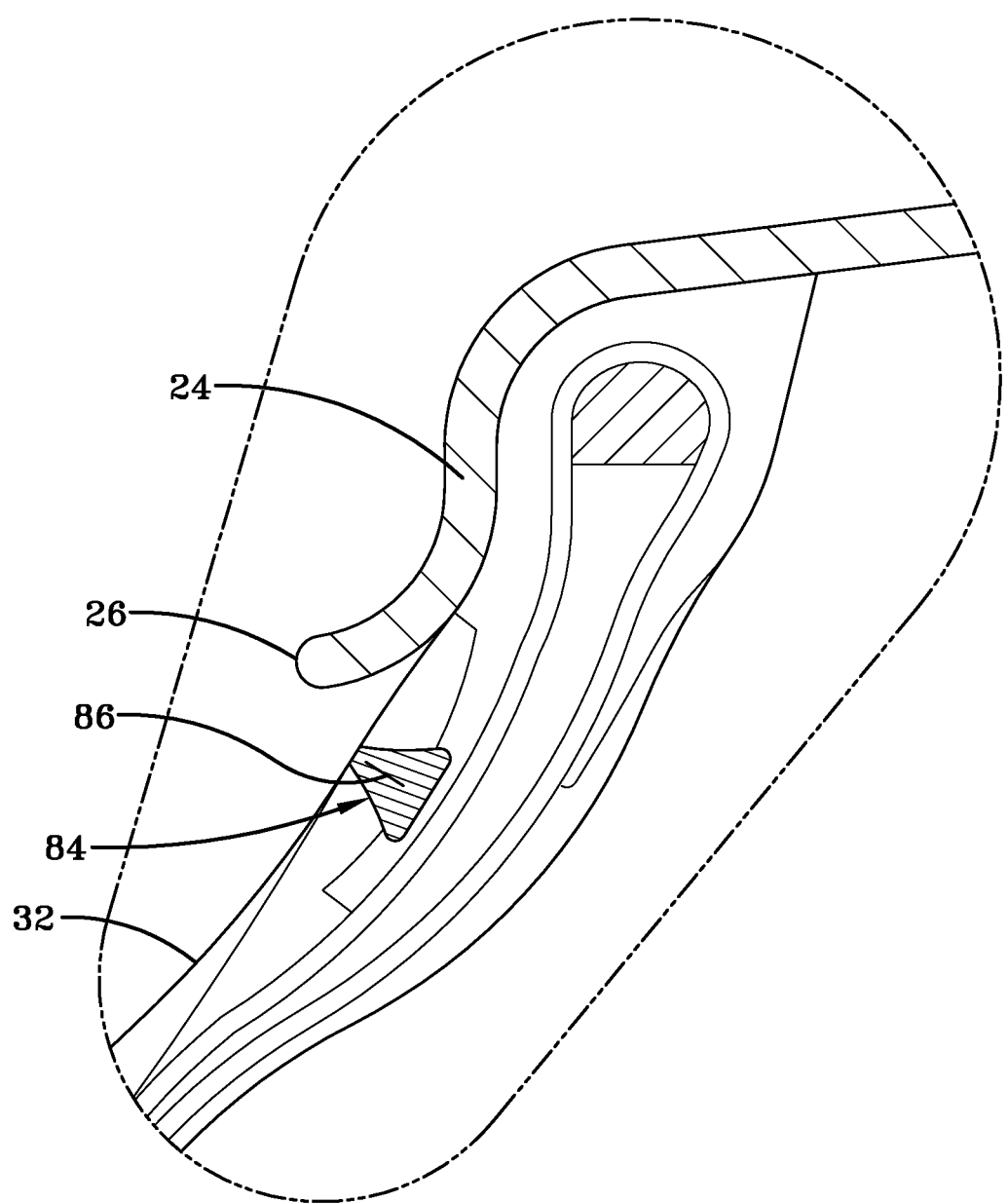
FIG. 7B is an enlarged section view of a portion of the tire bead region, rim, and collapsed tube segment identified in FIG. 7A.

FIGS. 7A and 7B shown the tire rotating against ground surface 78, placing the sidewall 32 in a stressed condition. The sidewall 32 bulges outwardly and imparts stress forces on the segment of the tube 84 to collapse the tube 84 and the air passageway 86 as shown. Once the collapsed tube segment is no longer opposite the tire footprint against surface 78, forces on the tube from the sidewall flexure are removed and the tube segment resumes its original, non-collapsed, configuration of FIGS. 6A and 6B. configuration.

With reference to 10A, 10B; 11A and 11B, a second alternative embodiment of a peristaltic tube 112 in a "fish-hook" configuration is shown. In the tube 112, a truncate wedge-shaped tube body 114 is defined by outwardly divergent sides 116, 118 and extends from a small diameter (D3) outboard flat surface 120 to an inboard domed cap region 122 of the tube 112. Extending outward and arching downward from the cap region 122 are wing projections 124, 126 along the tube 112. The surfaces 114, 116 of the wedge shaped body 114 outwardly diverge at an angle α. The wing projections 124, 126 project outward and arch backward toward the outboard flat surface 120 end of the body 116 at a reverse angle β. The wing projections 124, 126 each have an inward segment 132 which curves outwardly from the domed cap 122 at a radius R1 and an adjacent outward arching segment 128 that curves at a radius R2 to rounded ends 130. The ends 130 are formed at a radius of curvature R3. An elliptical air passageway 134 is located within the tube 112, having a major longitudinal axis oriented along a cross-sectional centerline of the tube. The passageway 134 has an outboard, axially outward end 136 situated within the wedge body 114 of the tube 112 and an inboard, axially inward end 138 situated within the cap region 122, equidistant between the wing projections 124, 126. The length of the elliptical passageway 134 is L2 and its transverse width is D2. D1 designates the wider span of the tube at the inboard, axially inward end and D3 the narrower end of the tube at surface 120. L1 designates the length of the tube from end 136 to end 138 and L3 is the distance within the tube from the end surface 120 to a center of the elliptical passageway 134.

Figure 11B:
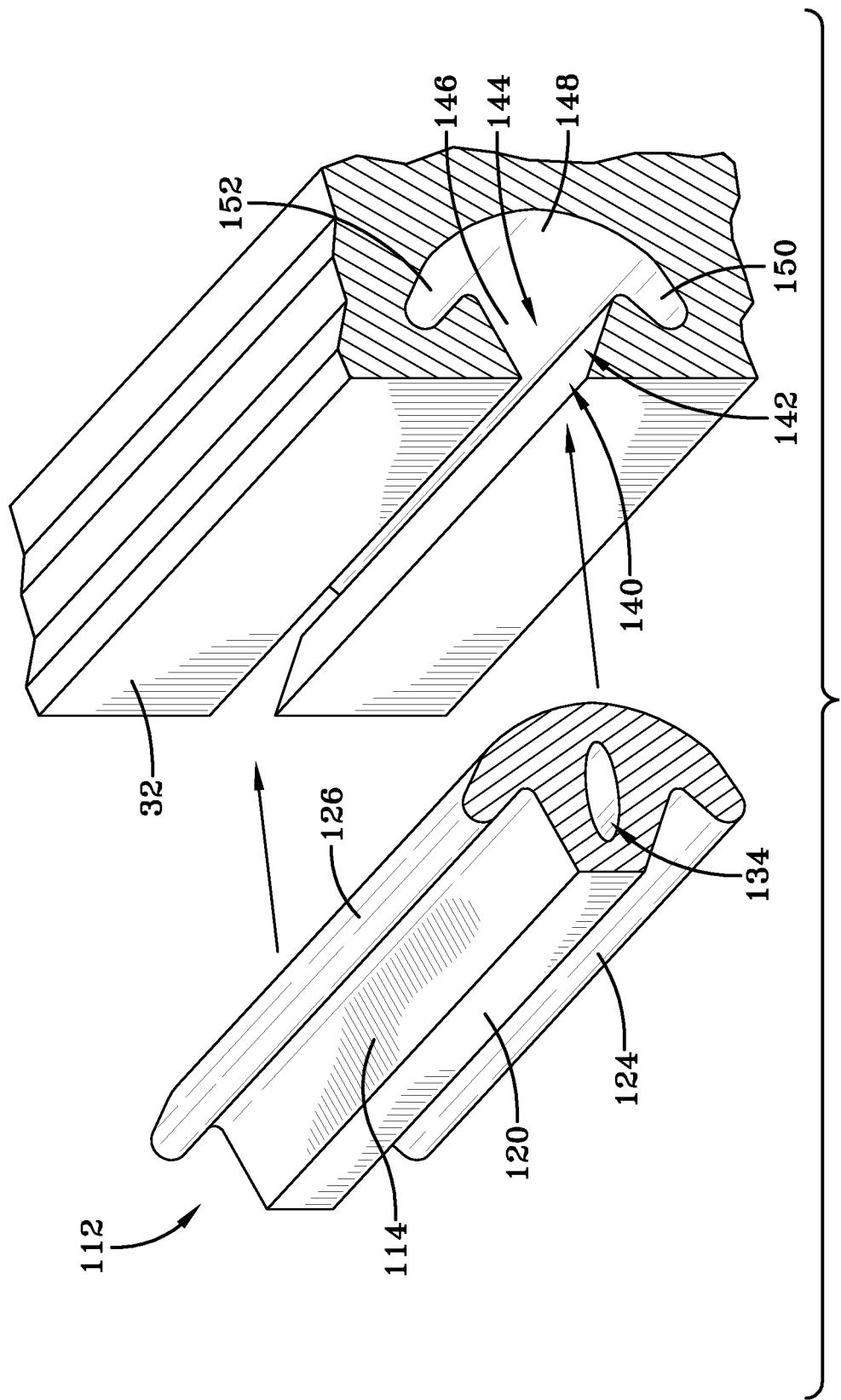
FIG. 11B is an exploded perspective view of a section of the first alternative tube embodiment and host sidewall groove.

The fish-hook shaped air tube 112 has preferred dimensions within the ranges specified below:

D1: 5.3+/−0.1 mm;
D2: 0.7+/−0.01 mm;
D3: 1.44+/−0.05 mm;
L1: 3.75 mm;
L2: 2.2+/−0.1 mm;
L3: 1.75+/−0.01 mm;
α: 24 degrees;
β: 30 degrees;
R1: 3.76 mm;
R2: 1.0 mm;
R3: 0.4 mm;
R4: 0.2 mm;

The groove 140 extends into sidewall 32 and is configured complementary to the tube 112 to include an entryway of width D3; a central chamber 144 including wedge shaped outboard chamber region 146 and inboard chamber cap region 148. Two lateral chamber pockets 150, 152 are formed and dimensioned to accept the wing projections 124, 126 of the tube 112. The dimension notation in FIG. 11A for the sidewall groove 144 corresponds with like-numbered dimensions in the tube 112.

Figure 8A:
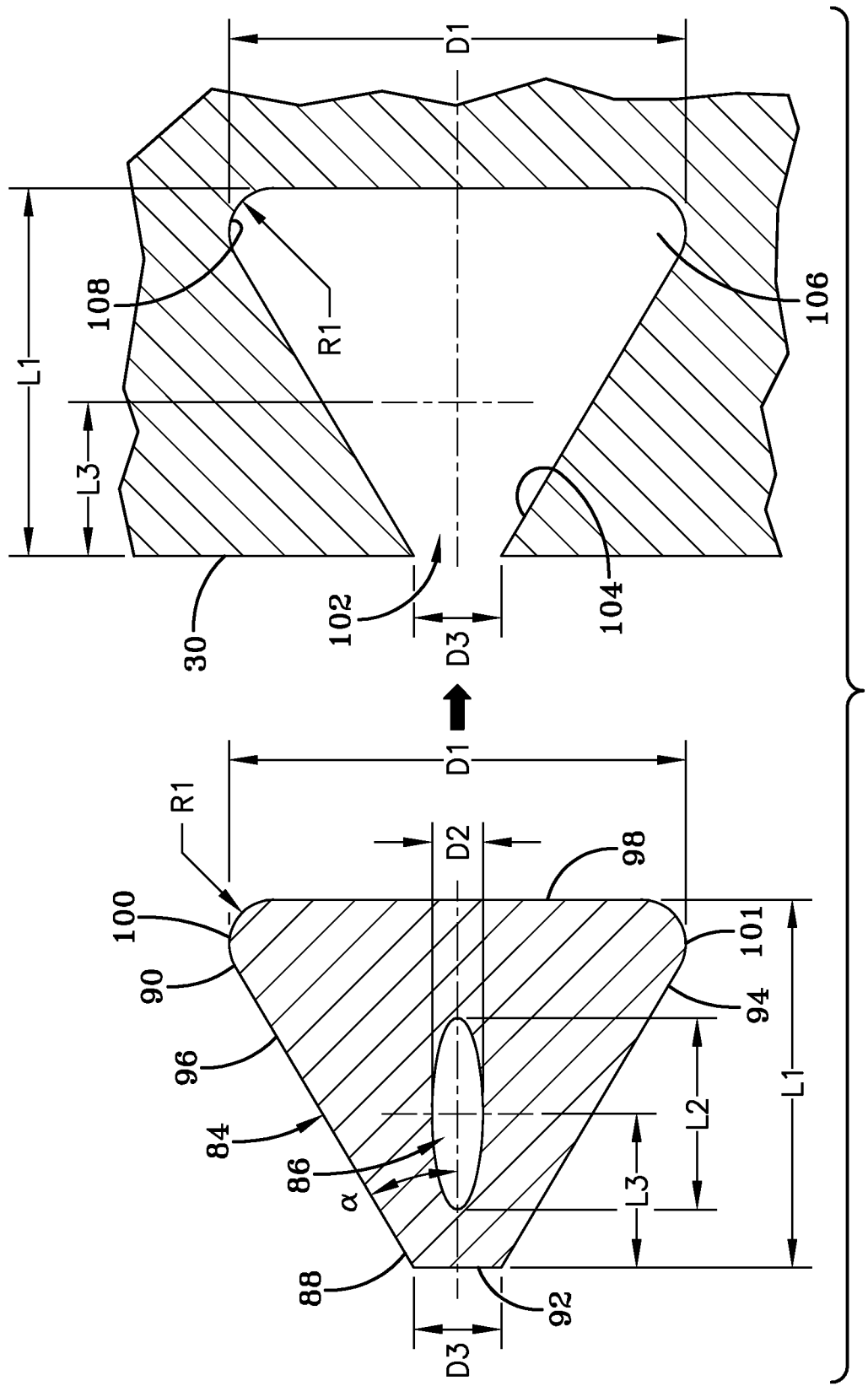
FIG. 8A is an enlarged sectional exploded view of the tube and tube-receiving groove within the tire sidewall.
Figure 8B:
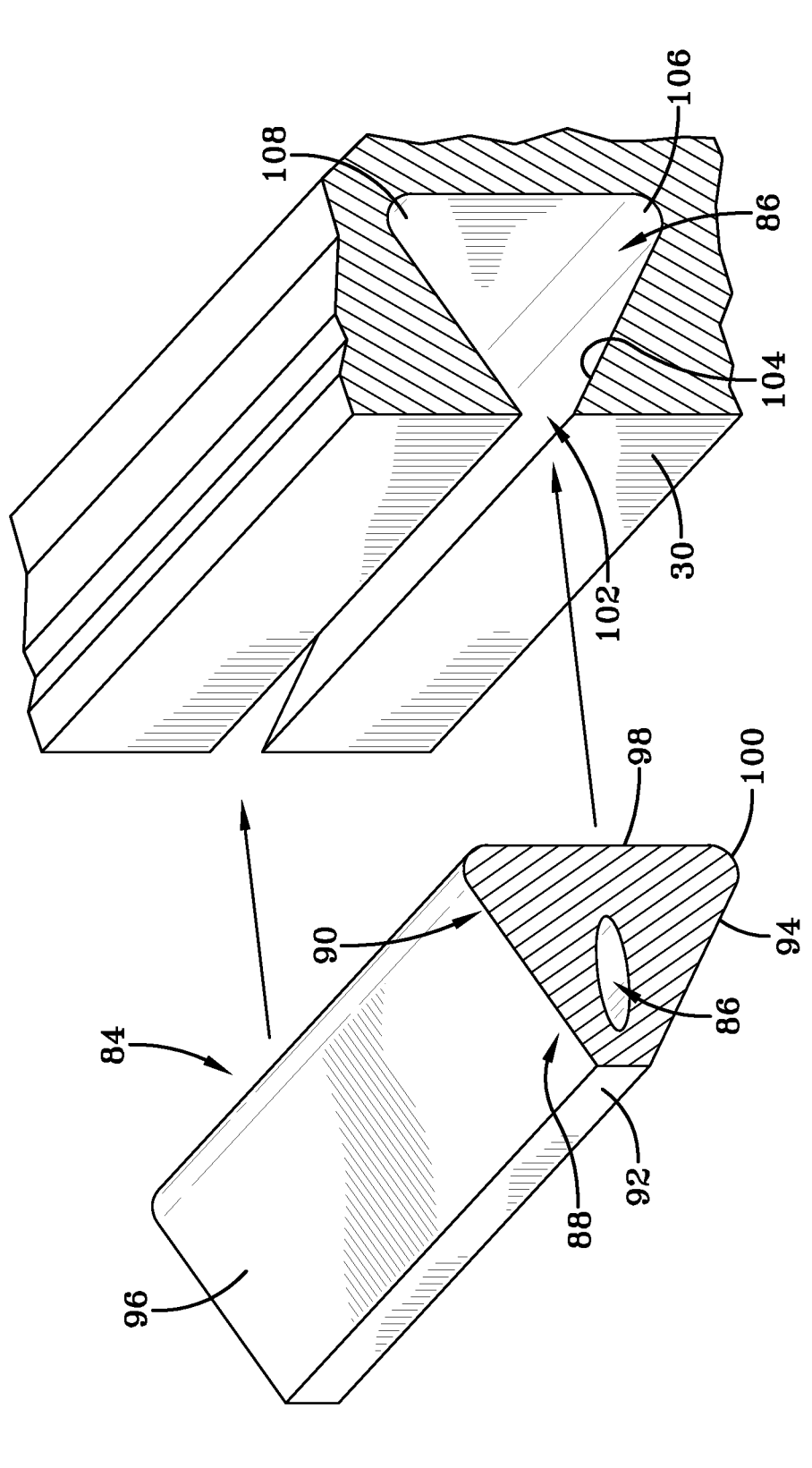
FIG. 8B is a subsequent sequential sectional view to FIG. 8A showing insertion of the tube into the sidewall groove.

Insertion of the tube 112 into the groove 140 is accomplished by compressing the tube into a flat enough dimension to fit within and through the opening 142. The wing projections 124, 126 resiliently fold inward to accommodate insertion. Once situated within the groove chamber 144, the tube 112 resiliently resumes its original form and fills the void of the groove chamber 144. The radius corners 130 of the wing projections 124, 126 of the tube are received within the respective radius pockets or corners 150, 152 of the groove. As shown, the wing projections 124, 126 are situated geometrically proximate the wider cap 122 of the tube 112. So located, the wing projections 124, 126, as with the first embodiment of FIGS. 8A and 8B, operationally resist lateral withdrawal of the air tube body 112 from the groove chamber 140. The arching wing projections 124, 126 thus serve to fold inward during tube insertion and, once inserted, snap-in groove pockets to retain the tube 112 within the groove chamber 140. The wing projections in the forms shown in the alternative embodiments do not interfere with or degrade the tube's capability of performing its primary intended function as an air pumping device through cyclical segment by segment collapsing and expansion of the tube in a rolling tire footprint. The tube 112 is retained within the groove chamber by wing projections 124, 126 but can still react to the stresses imposed from flexure of the tire sidewall 32 to collapse segment by segment along the air passageway 134 to thereby pump air along the passageway and into the tire cavity.

Figure 10A:
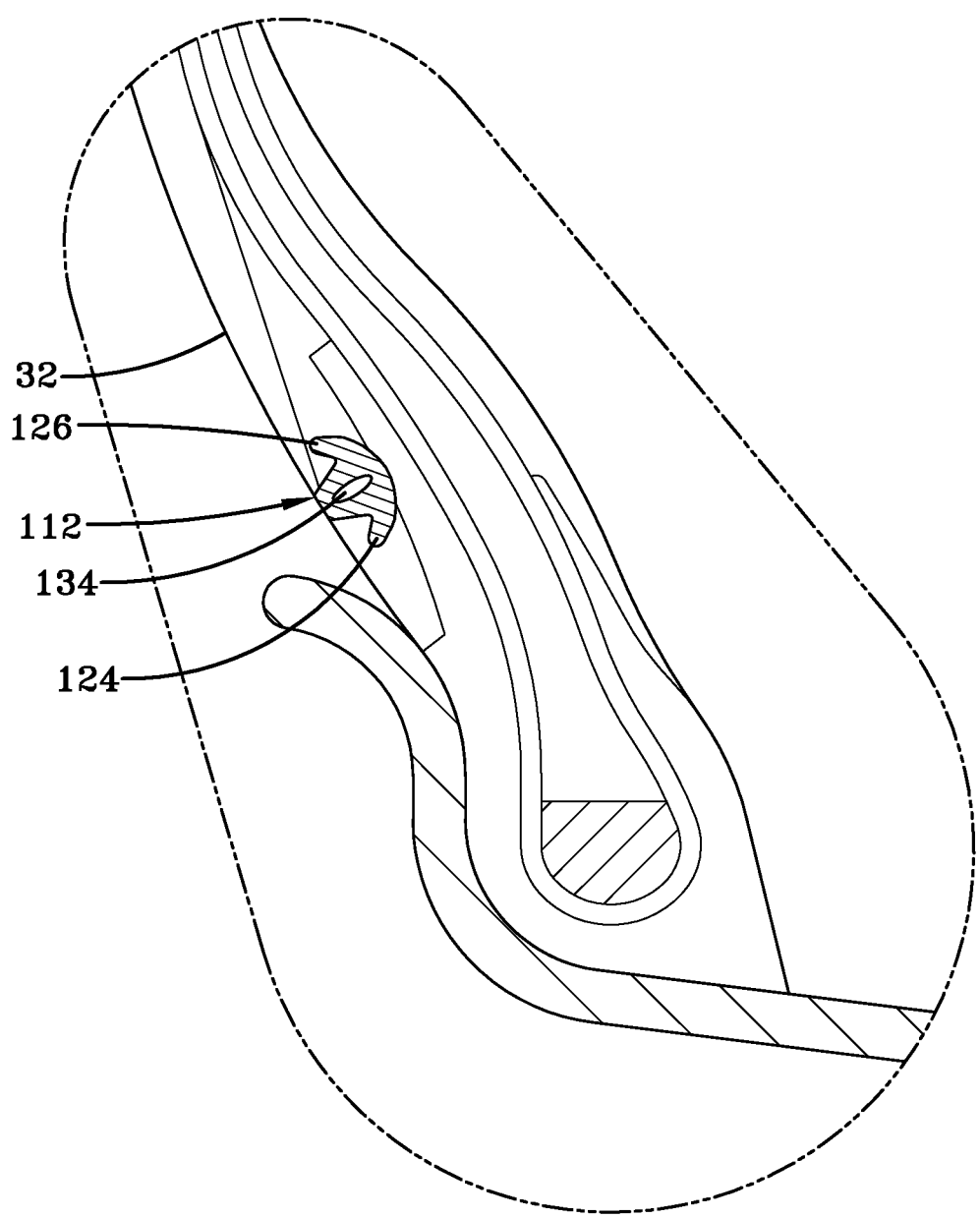
FIG. 10A is a is an enlarged sectional exploded view of a first alternative embodiment of a tube in an open condition and positioned within a tube-receiving groove within a tire sidewall.
Figure 10B:
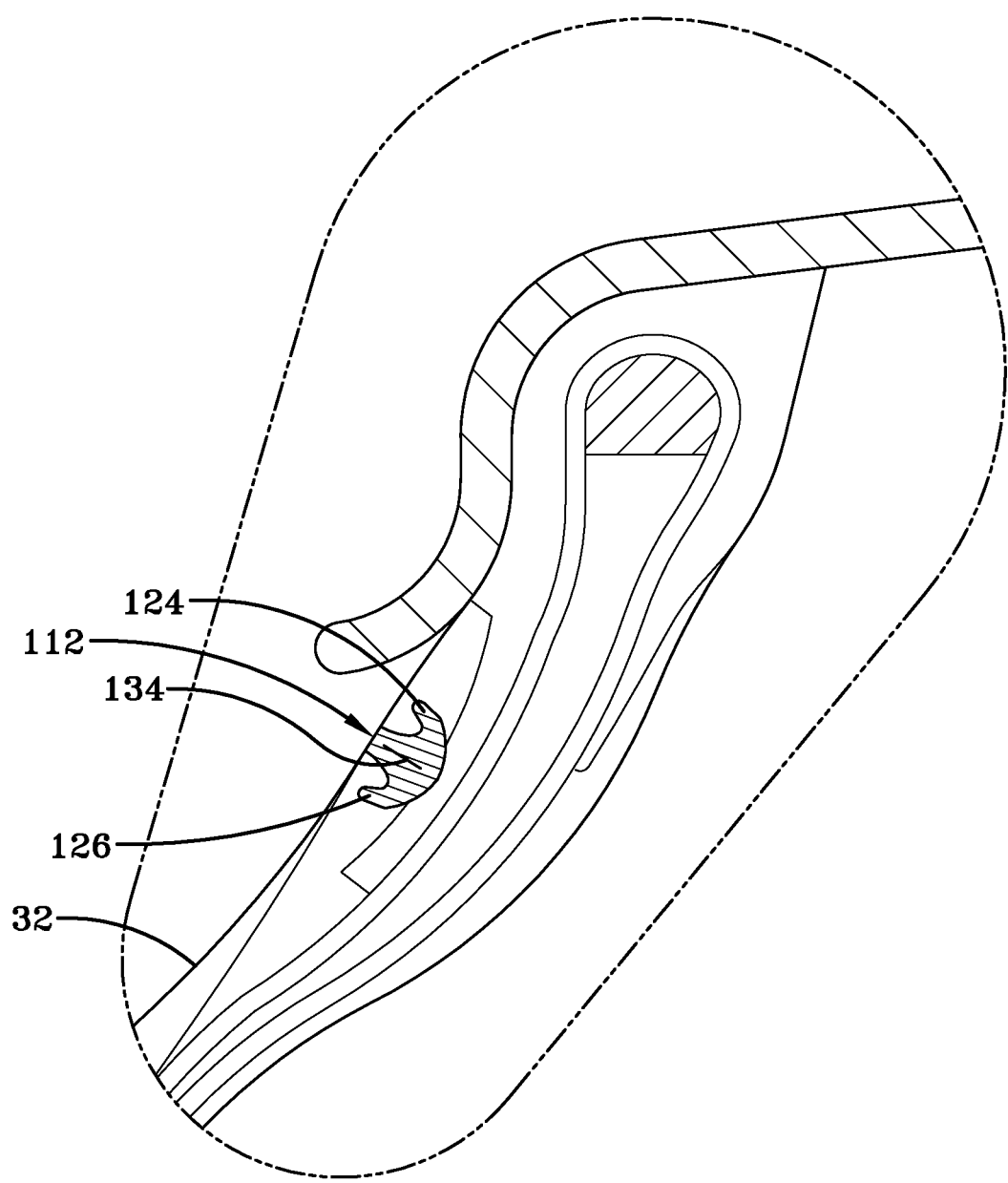
FIG. 10B is a an enlarged sectional view of the first alternative tube embodiment in a closed condition within the tire sidewall.

FIG. 10A is a transverse section view through a tire showing the tube 112 within the groove 140 in a non-collapsed condition outside of a rolling tire footprint. FIG. 10B shows the tube 112 in a collapsed condition within the groove 140 as the segment of tire sidewall 32 within a rolling tire rotates to a location opposite a tire footprint. Once the collapsed tube segment is no longer opposite the tire footprint, forces imposed on the tube from the sidewall flexure are removed and the tube segment resumes its original, non-collapsed, configuration shown in FIG. 10A.

Referring to FIGS. 12A, 12B, 13A and 13B, a third embodiment of a peristaltic tube 154 is shown in a winged "bull-horn" configuration. In the tube 154, a truncate wedge-shaped tube body 156 is defined by outwardly divergent sides that extend from a small diameter (D3) outboard flat end surface 160 to an inboard domed cap region 158 of the tube 154. Extending outward from generally a midsection of the tube 154 are oppositely directed triangular wing projections 162, 164 each extending to an end 165 having a radius R3. The wing projections 162, 164 are distanced L3 from the end wall 160 and the tube is dimensioned in transverse section L1. The sides of the wedge shaped body 156 outwardly diverge at an angle $\alpha$ to a curved body section 163 having a radius R2. The wing projections 162, 164 project outward at right angles from the body 154. The cap region 158 of the body 154 has a radius of R2. An elliptical air passageway 166 is located within the tube 154, having a major longitudinal axis oriented along a cross-sectional centerline of the tube. The passageway 166 has an outboard, axially outward end 168 situated within the wedge body 156 of the tube 154 and an inboard, axially inward end 170 situated within the cap region 158. The length of the elliptical passageway 166 is L2 and its transverse width is D2. D1 designates the tip to tip span of the tube and D3 the narrower end of the tube at surface 160. L3 is the distance within the tube from the end surface 160 to a center of the elliptical passageway 166.

The air tube 154 accordingly has preferred dimensions within the ranges specified below:

D1: 6.03+/−0.1 mm;
D2: 0.7+/−0.01 mm;
D3: 1.05+/−0.05 mm;
L1: 3.74 mm;
L2: 2.2+/−0.1 mm;
L3: 1.78+/−0.01 mm;
$\alpha$: 37 degrees;
R1: 1.35 mm;
R2: 0.7 mm;
R3: 0.13 mm;

The groove 172 is complementarily configured to accept tube 154 and extends into one of the tire sidewalls such as 32. The groove is configured to complement to the tube 154 and includes an entryway 174 of width D3; a central chamber including wedge shaped outboard chamber region 176 and inboard chamber cap region 178. Two lateral chamber pockets 180, 182 are formed and dimensioned to accept the wing projections 162, 164 of the tube 154. The dimension notations in FIG. 13A for the sidewall groove 172 correspond with like-numbered dimensions to the tube 154 as indicated.

Insertion of the tube 154 into the groove 172, as with previous tube embodiments, is accomplished by compressing the tube into a flat enough dimension to fit within and through the opening 174. The wing projections 162, 164 resiliently fold inward to accommodate insertion. Once situated within the groove chamber, the tube 154 resiliently resumes its original form and fills the void of the groove chamber. The radius tips 163 of the wing projections 162, 164 of the tube "snap-fit", i.e. resiliently flex outward, into respective radius pockets 180, 182 of the groove 172. So located, the wing projections 162, 164, as with previously described embodiments, operationally resist lateral withdrawal of the air tube body 154 from the groove chamber. The wing projections 162, 164 thus serve to retain the tube within the groove 172 without interfering with or degrading the tube's capability of performing its primary intended function as an air pumping device that cyclical deforms segment by segment by collapsing and expansion of the tube in a rolling tire footprint. The tube 154 is retained within the groove chamber by wing projections 162, 164 but can still react to the stresses imposed from flexure of the tire sidewall 32, thus collapsing segment by segment along the air passageway 166 to thereby pump air along the passageway and into the tire cavity.

Figure 12A:
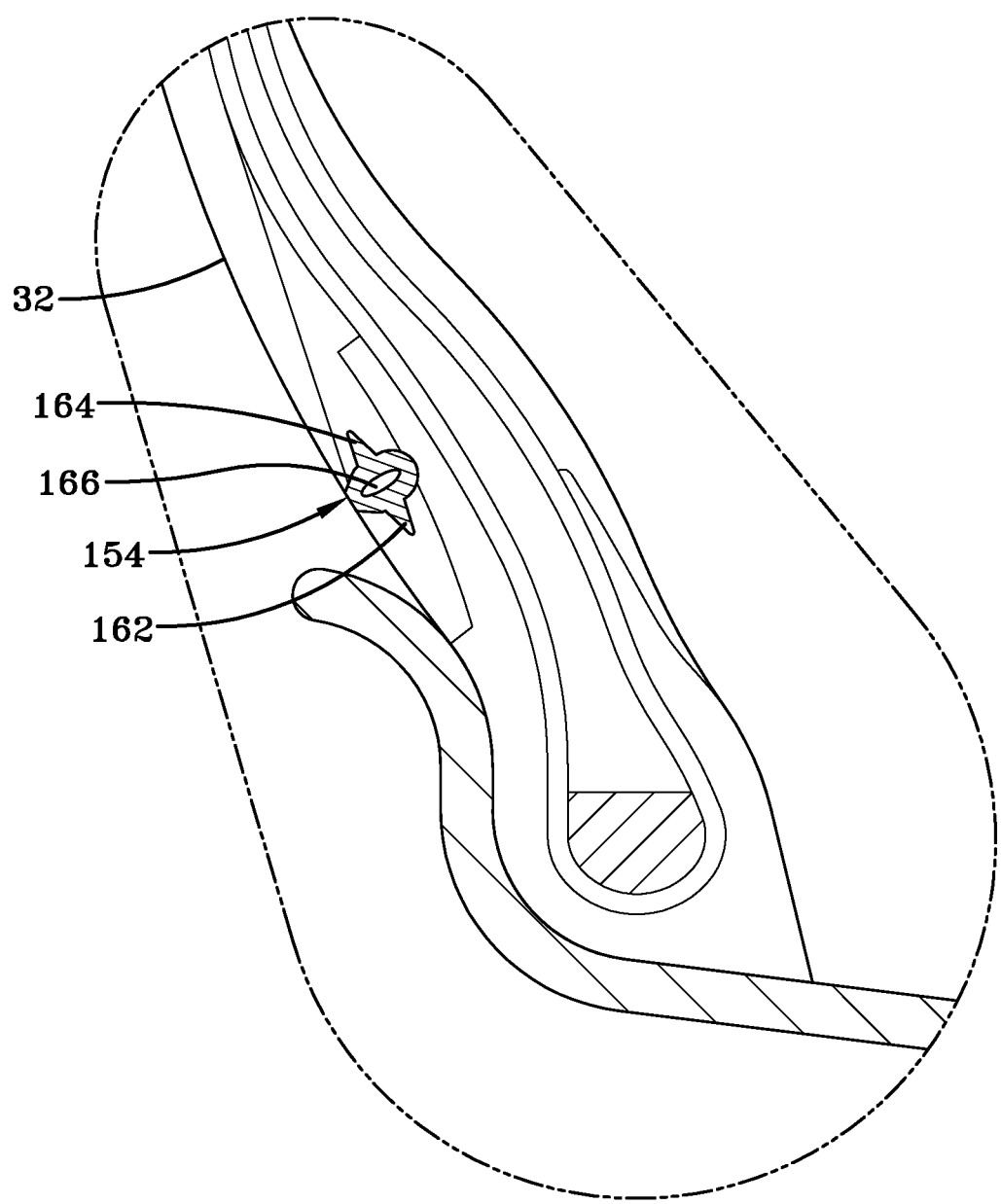
FIG. 12A is an enlarged sectional exploded view of a second alternative embodiment of a tube in an open condition and positioned within a tube-receiving groove within a tire sidewall.
Figure 12B:
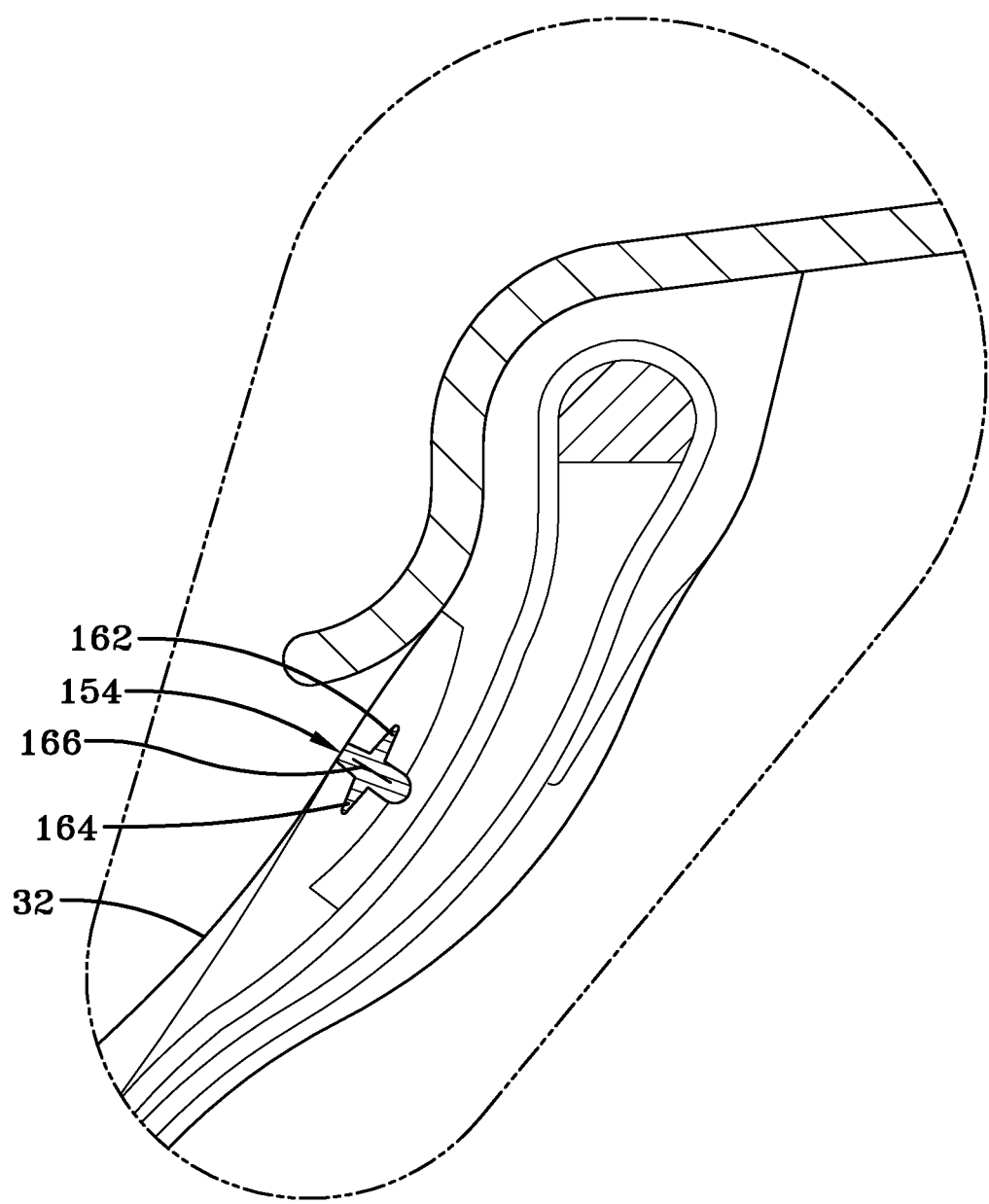
FIG. 12B is an enlarged sectional view of the second alternative tube embodiment in a closed condition within the tire sidewall.
Figure 13A:
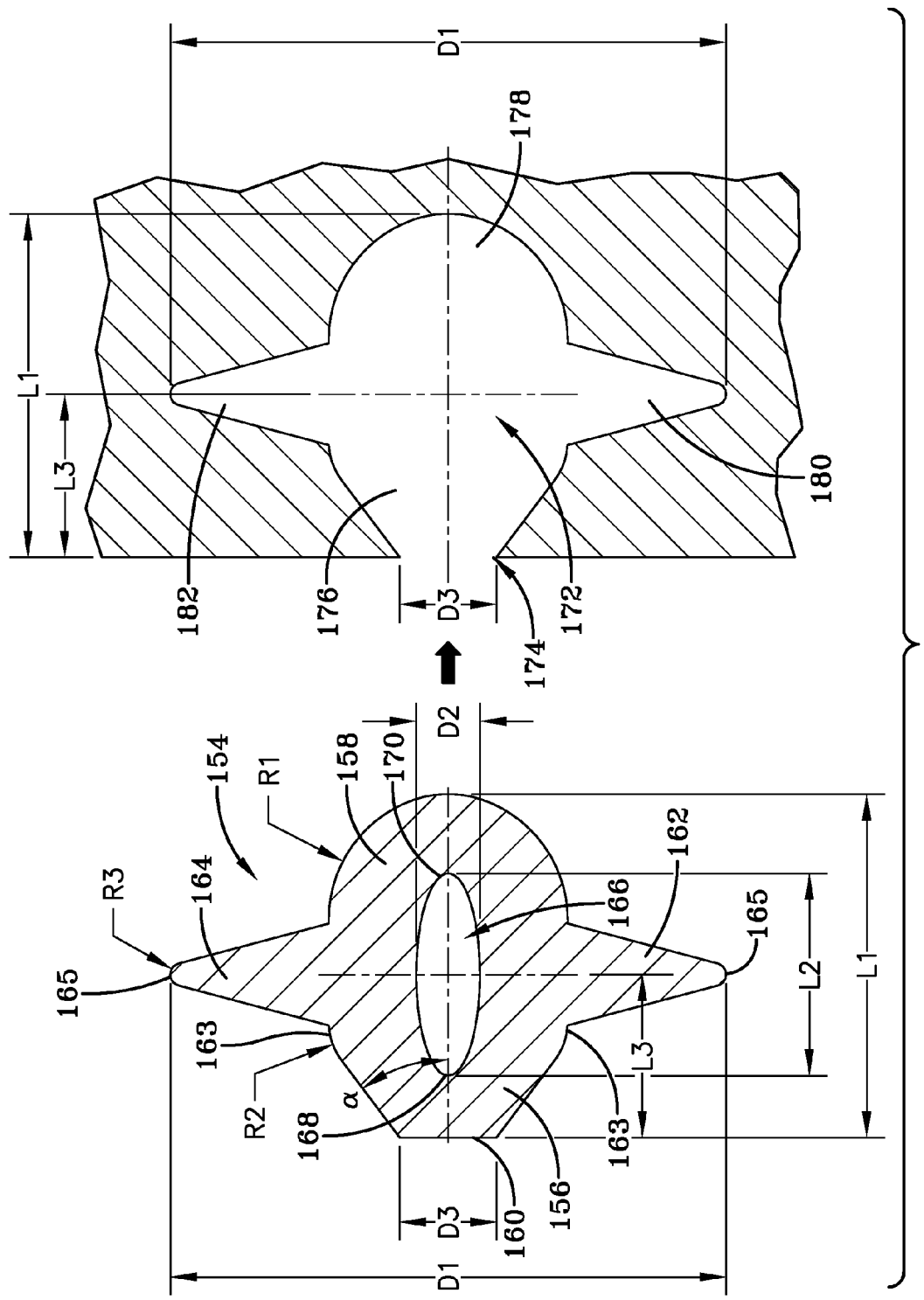
FIG. 13A is an enlarged exploded sectional view of the second alternative tube embodiment and host sidewall groove.
Figure 13B:
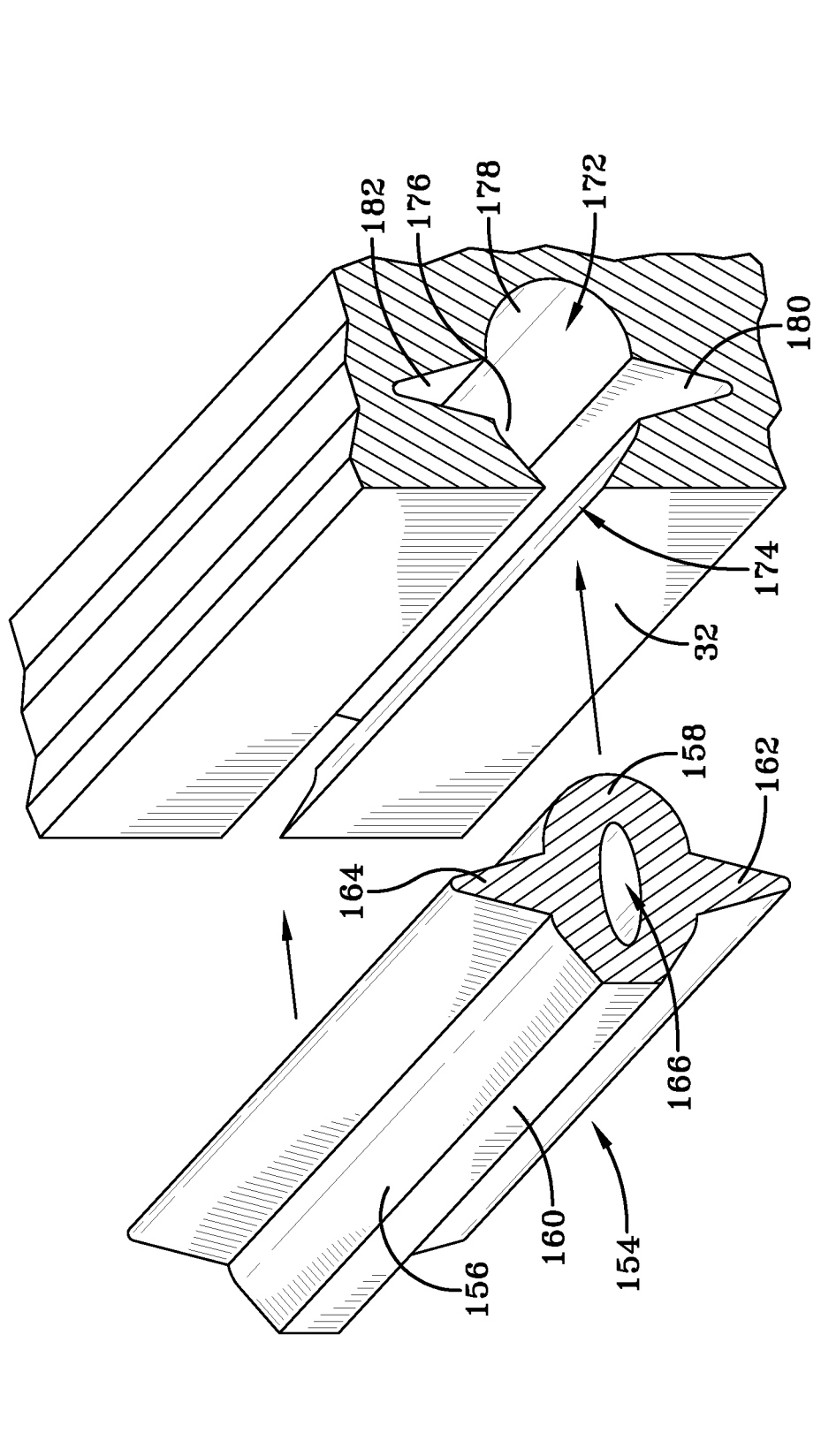
FIG. 13B is an exploded perspective view of a section of the second alternative tube embodiment and host sidewall groove.

FIG. 12A is a transverse section view through a tire showing the tube 154 oriented within the groove 172 in a non-collapsed condition outside of a rolling tire footprint. FIG. 12B shows a segment of the tube 154 in a collapsed condition within the groove 172 as the segment reaches a location opposite a tire footprint. Once the collapsed tube segment is no longer opposite the tire footprint, forces imposed on the tube from the sidewall flexure are removed and the tube segment resumes its original, non-collapsed, configuration shown in FIG. 12A.

Referring to FIGS. 15A, 15B, 16A and 16B, a fourth embodiment of a peristaltic tube 184 is shown in a "mushroom" configuration. The tube 184 includes a truncate wedge-shaped outboard tube body portion 186 defined by outwardly divergent sides extending from a small diameter (D3) flat end surface 190 to an inboard domed cap region 188. Extending outward from the cap portion 188 are oppositely directed wing projections 192, 194 each having an upper arcuate surface 193 of radius R1 and an underside flat surface 195. The wing projections 192, 194 are distanced L4 from the end wall 190 and the tube is dimensioned in transverse section L1. The sides of the wedge shaped body 186 outwardly diverge at an angle $\alpha$ and intersect the wing projection underside surface 195. The cap region 188 of the tube 184 is flat on the inward end. An elliptical air passageway 196 is located within the tube 184, having a major longitudinal axis oriented along a cross-sectional centerline of the tube. The passageway 196 has an outboard, axially outward end 198 situated within the wedge body portion 186 and an inboard, axially inward end 200 situated within the cap region 188. The length of the elliptical passageway 196 is L2 and its transverse width is D2. D1 designates the tip to tip span of the tube and D3 the diameter of the narrower end of the tube at surface 190. L3 is the distance within the tube from the end surface 190 to a center of the elliptical passageway 196.

The air tube 184 accordingly has preferred dimensions within the ranges specified below:

D1: 6.39+/−0.1 mm;
D2: 0.7+/−0.01 mm;
D3: 1.44+/−0.05 mm;
L1: 4.25 mm;
L2: 2.2+/−0.1 mm;
L3: 1.78+/−0.01 mm;
L4: 1.83+/−0.05 mm;
$\alpha$: 24 degrees;
R1: 1.85 mm;

The groove 202 is configured to accept tube 184 and extends into a tire sidewall such as sidewall 32. The groove 202 is configured complementary to the tube 184 and includes an entryway 204 of width D3; a central chamber including a wedge shaped outboard chamber region 206 and an inboard chamber cap region 208. Two lateral chamber pockets 210, 212 are formed and dimensioned to accept the wing projections 192, 194 of the tube 184. The dimension notations in FIG. 16A for the sidewall groove 202 correspond with like-numbered dimensions to the tube 184 as indicated.

Insertion of the tube 184 into the groove 202, as with previous tube embodiments, is accomplished by compressing the tube into a flat enough dimension to fit within and through the opening 204. The wing projections 192, 194 resiliently fold inward to accommodate insertion. Once situated within the groove chamber, the tube 184 resiliently resumes its original form and fills the void of the groove chamber. The wing projections 192, 194 of the tube are received within the respective ancillary pockets 210, 212 of the groove 202. So located, the wing projections 192, 194, as with previously described embodiments, operationally resist lateral withdrawal of the air tube body 184 from the groove chamber. The wing projections 192, 194 thus serve to retain the tube 184 within the groove 202 without interfering or degrading the tube's capability of performing its primary intended function as an air pumping device that cyclical deforms segment by segment in a rolling tire footprint. The tube 184 is retained within the groove chamber by wing projections 192, 194 yet can still react to the stresses imposed from flexure of the tire sidewall 32 to collapse segment by segment along the air passageway 196 to thereby pump air along the passageway and into the tire cavity.

Figure 15A:
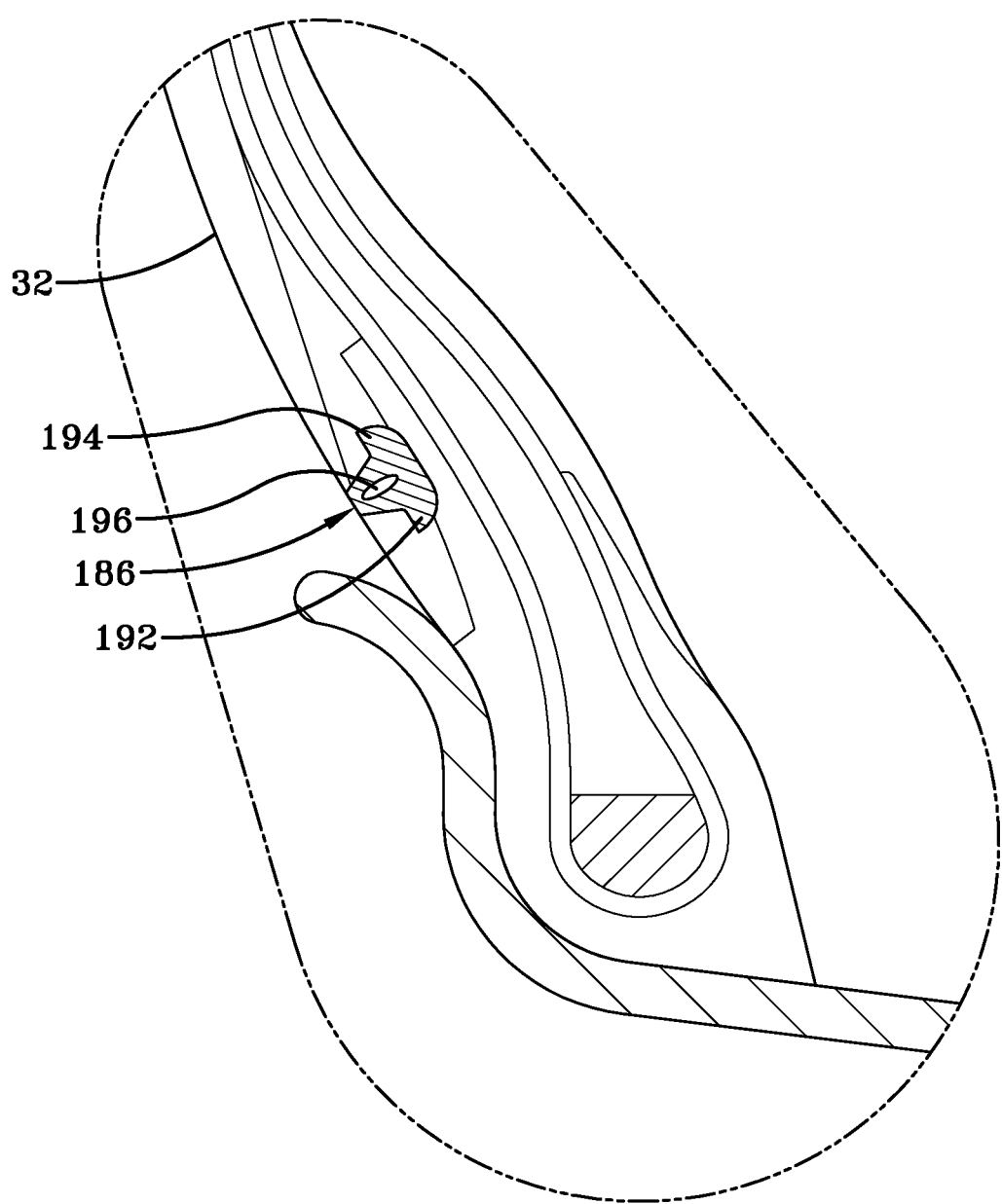
FIG. 15A is an enlarged sectional exploded view of a third alternative embodiment of a tube in an open condition and positioned within a tube-receiving groove within a tire sidewall.
Figure 15B:
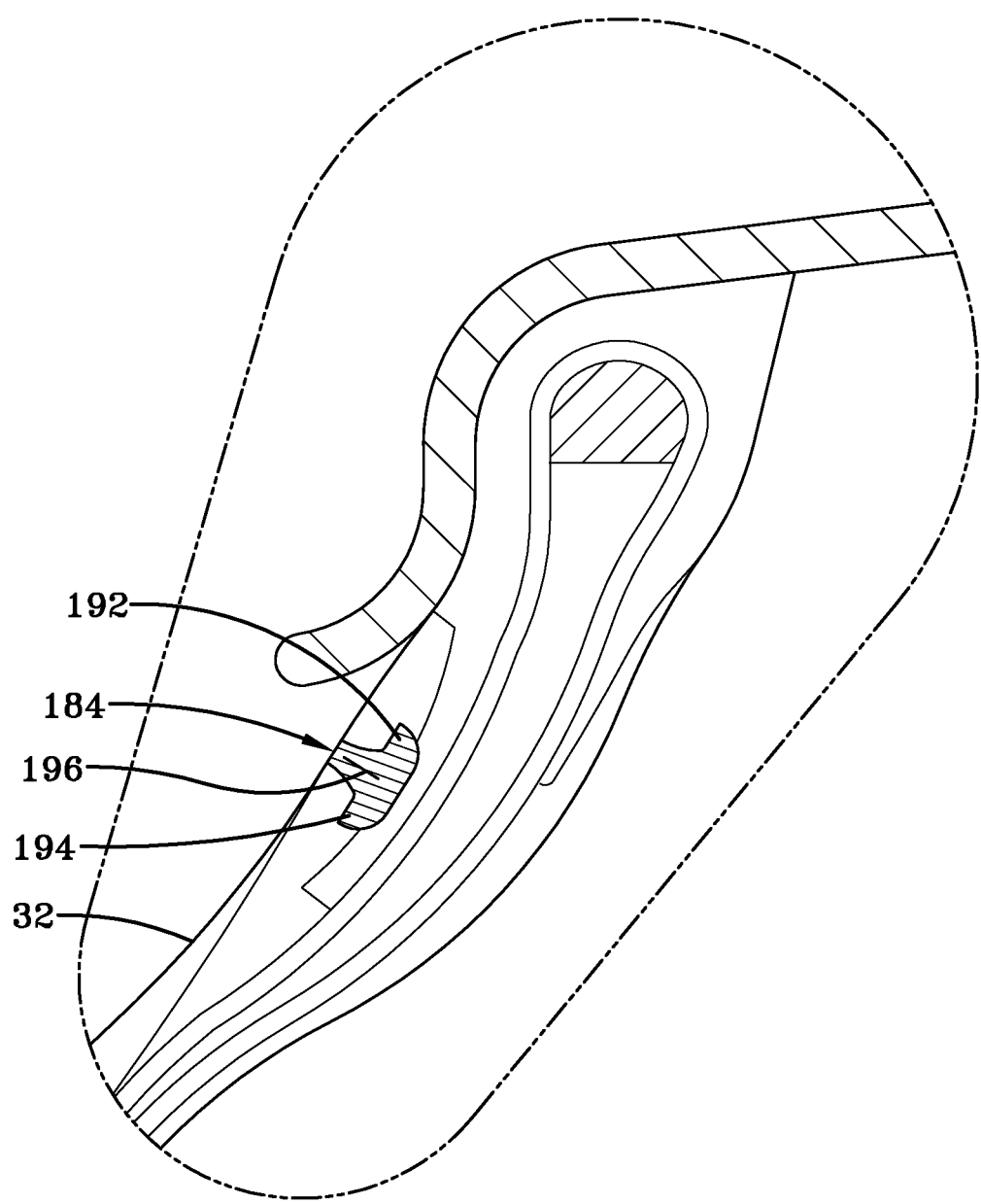
FIG. 15B is an enlarged sectional view of the third alternative tube embodiment in a closed condition within the tire sidewall.
Figure 16B:
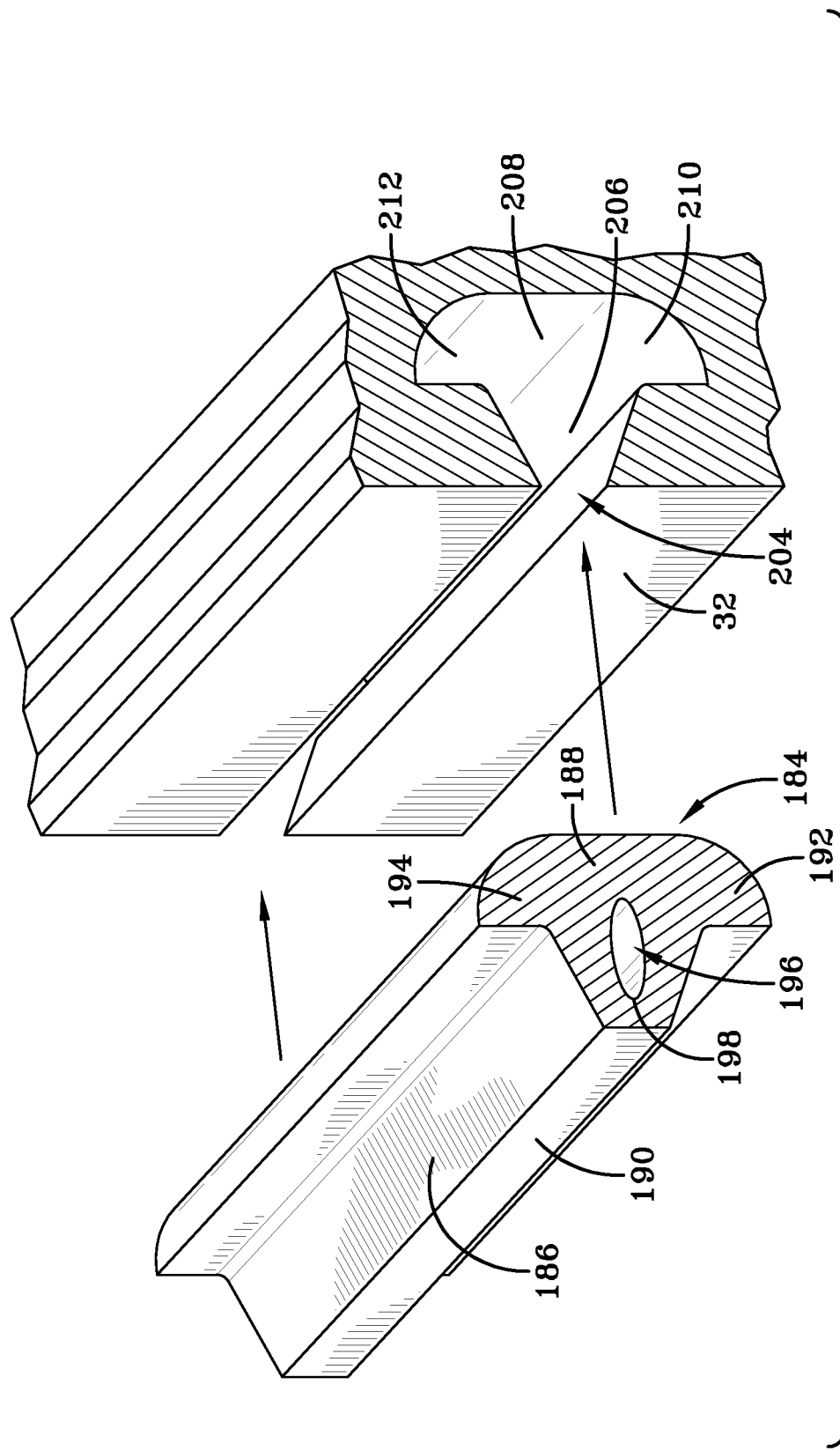
FIG. 16B is an exploded perspective view of a section of the third alternative tube embodiment and host sidewall groove.

FIG. 15A is a transverse section view through a tire showing the tube 184 oriented within the groove 192 in a non-collapsed condition outside of a rolling tire footprint. FIG. 15B shows a segment of the tube 184 in a collapsed condition within the groove 192 as the segment reaches a location opposite a tire footprint. Once the collapsed tube segment is no longer opposite the tire footprint, forces imposed on the tube from the sidewall flexure are removed and the tube segment resumes its original, non-collapsed, configuration shown in FIG. 15A.

Referring to FIGS. 18A, 18B, 19A and 19B, a fifth embodiment of a peristaltic tube 214 is shown in a "fishtail" configuration. The tube 214 includes a truncate wedge-shaped outboard tube body portion 216 defined by outwardly divergent sides extending from a small diameter (D3) flat end surface 220 to an inboard domed cap region 218. Extending outward from the cap portion 218 are oppositely directed wing projections 222, 224 each having an upper generally planar surface 223 and an underside planar surface 225. The wing projections 222, 224 have a thickness L4 and are at a distance L1 from the end wall 220. The sides of the wedge shaped body portion 216 outwardly diverge at an angle α and intersect the wing projection underside surface 225. The cap region 218 of the tube 214 is flat across the inward end. An elliptical air passageway 226 is located within the tube 214, having a major longitudinal axis oriented along a cross-sectional centerline of the tube. The passageway 226 has an outboard, axially outward end 228 situated within the wedge body portion 226 and an inboard, axially inward end 230 situated within the cap region 218. The length of the elliptical passageway 226 is L2 and its transverse width is D2. D1 designates the tip to tip span of the tube and D3 the diameter of the narrower end of the tube at surface 220. L3 is the distance within the tube from the end surface 220 to a center of the elliptical passageway 226.

The air tube 184 accordingly has preferred dimensions within the ranges specified below:
D1: 6.4+/−0.05 mm;
D2: 0.75+/−0.01 mm;
D3: 1.45+/−0.05 mm;
D4: 2.6+/−0.01 mm;
L1: 5 mm;
L2: 3+/−0.01 mm;
L3: 2.18+/−0.01 mm;
L4: 1+/−0.05 mm;
α: 28 degrees.

A groove 232 is configured to accept tube 214 and extends into a tire sidewall such as sidewall 32. The groove 232 is configured complementarily to the tube 214 and includes an entryway 234 of width D3; a central chamber including a wedge shaped outboard chamber region 236 and an inboard chamber cap region 238. Two lateral chamber pockets 240, 242 are formed and dimensioned to accept the wing projections 222, 224 of the tube 214. The dimension notations in FIG. 19A for the sidewall groove 232 correspond with like-numbered dimensions to the tube 214 as indicated.

Insertion of the tube 214 into the groove 232, as with previous tube embodiments, is accomplished by compressing the tube into a flat enough dimension to fit within and through the opening 234. The wing projections 222, 224 resiliently fold inward to accommodate insertion. Once situated within the groove chamber, the tube 214 resiliently resumes its original form and fills the void of the groove chamber. The wing projections 222, 224 of the tube snap-fit within the respective ancillary pockets 240, 242 of the groove 232 by resiliently flexing outward into a non-folded configuration. So located, the wing projections 222, 224, as with previously described embodiments, operationally resist lateral withdrawal of the air tube body 214 from the groove chamber. The wing projections 222, 224 thus serve to retain the tube 214 within the groove 232 without interfering or degrading the tube's capability of performing its primary intended function as an air pumping device that cyclical deforms segment by segment in a rolling tire footprint. The tube 214 is retained within the groove chamber by wing projections 222, 224 yet can still react to the stresses imposed from flexure of the tire sidewall 32 to collapse segment by segment along the air passageway 226 to thereby pump air along the passageway and into the tire cavity.

Figure 18A:
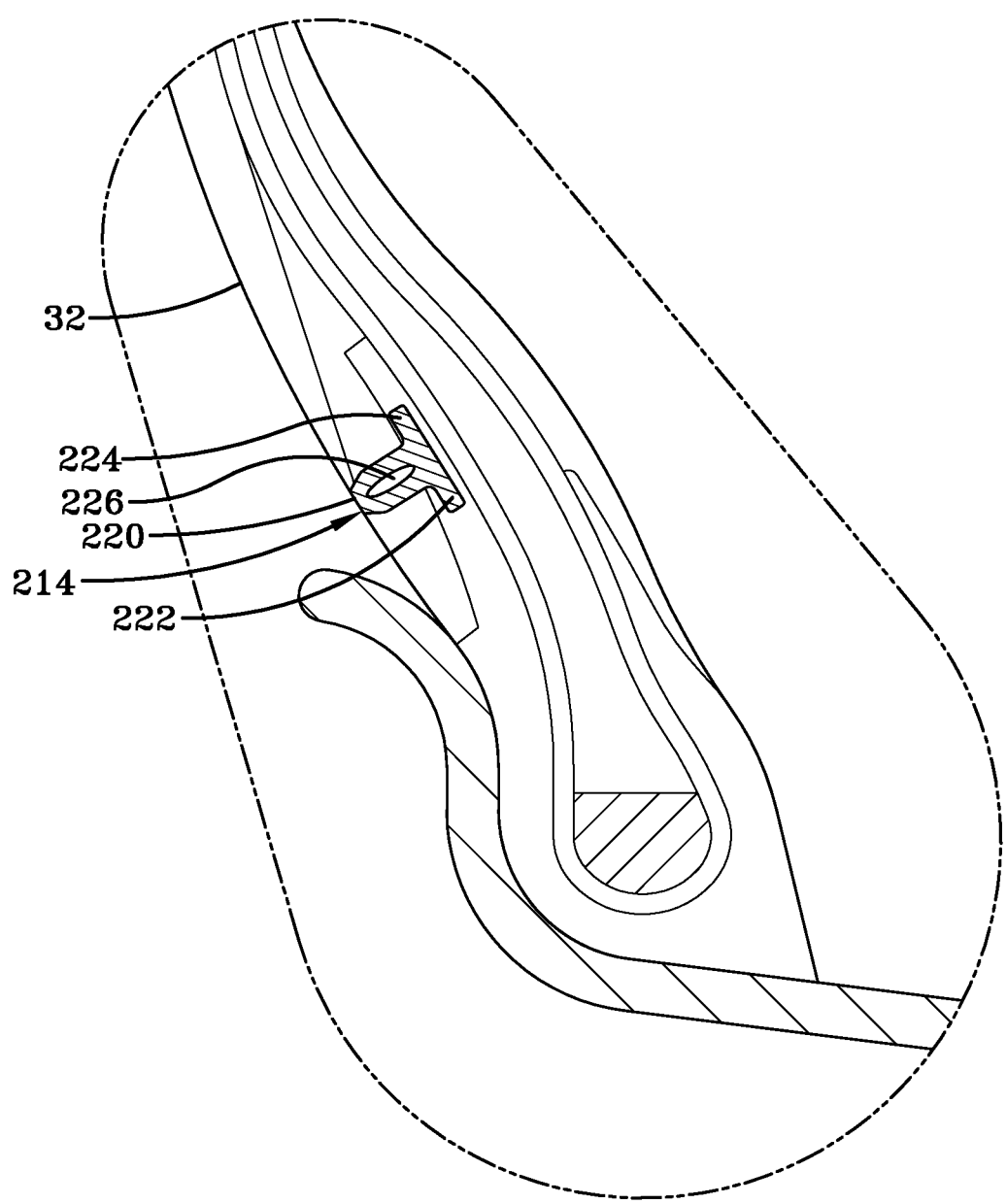
FIG. 18A is an enlarged sectional exploded view of a fourth alternative embodiment of a tube in an open condition and positioned within a tube-receiving groove within a tire sidewall.
Figure 18B:
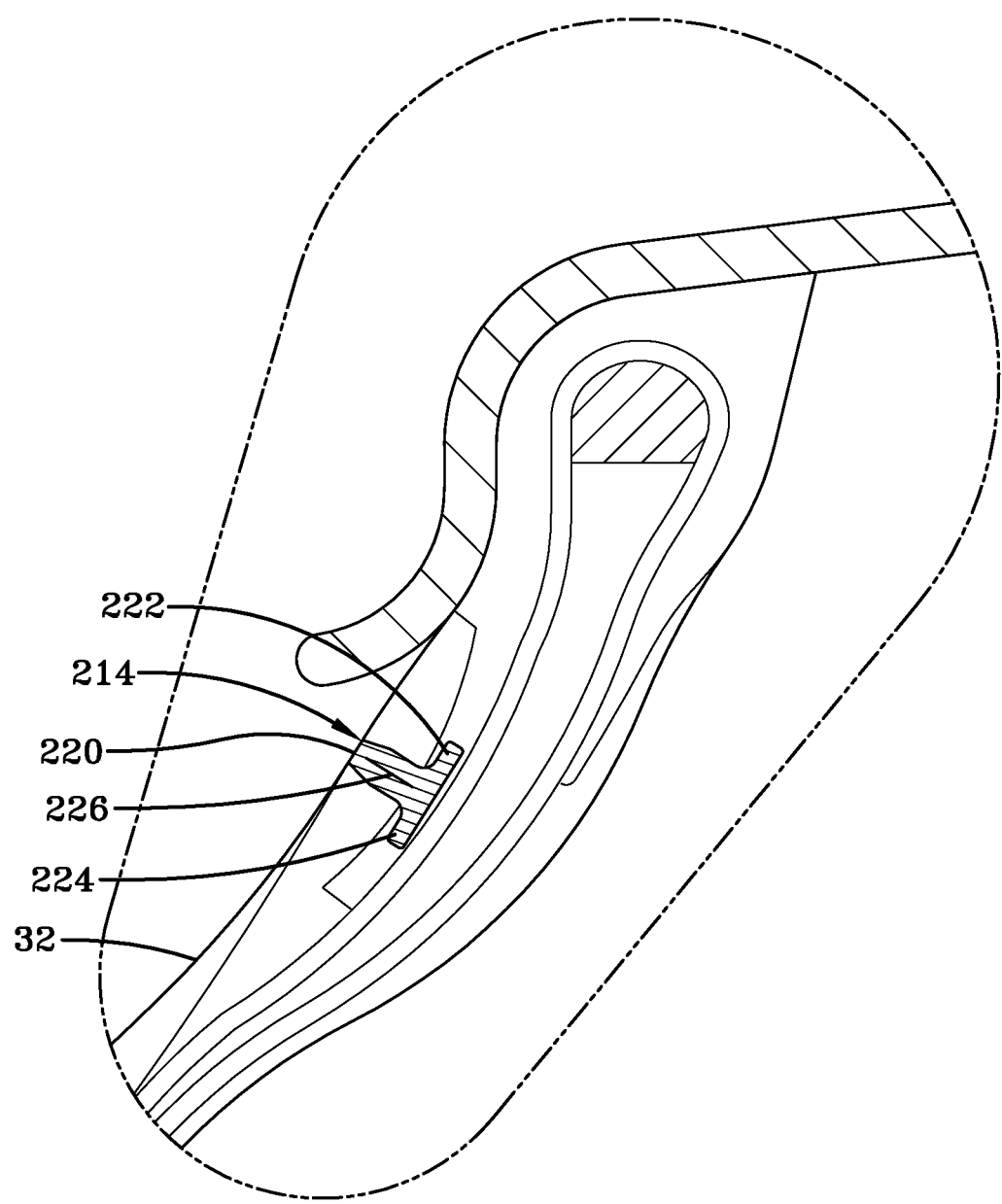
FIG. 18B is an enlarged sectional view of the fourth alternative tube embodiment in a closed condition within the tire sidewall.
Figure 19A:
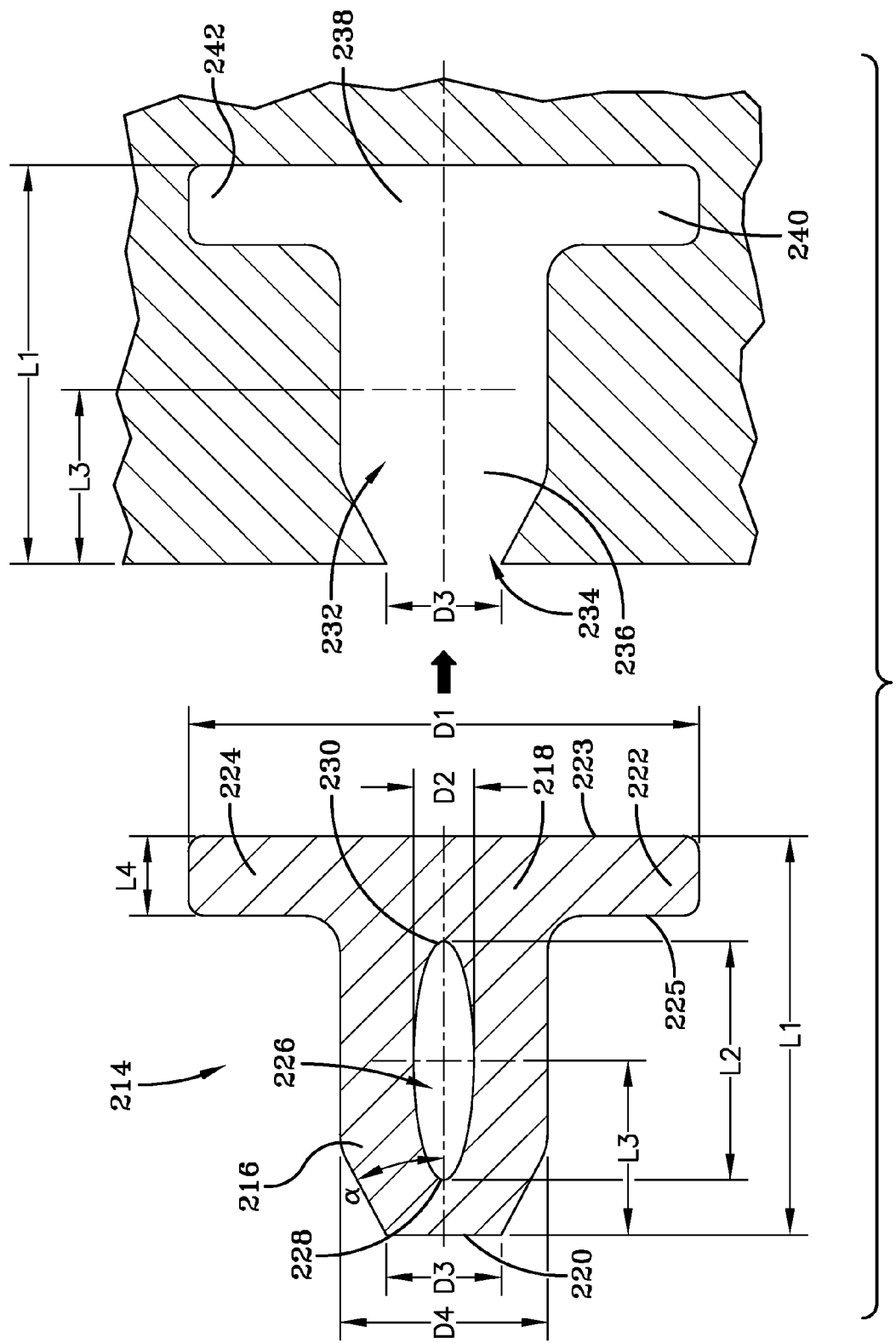
FIG. 19A is an enlarged exploded sectional view of the fourth alternative tube embodiment and host sidewall groove.
Figure 19B:
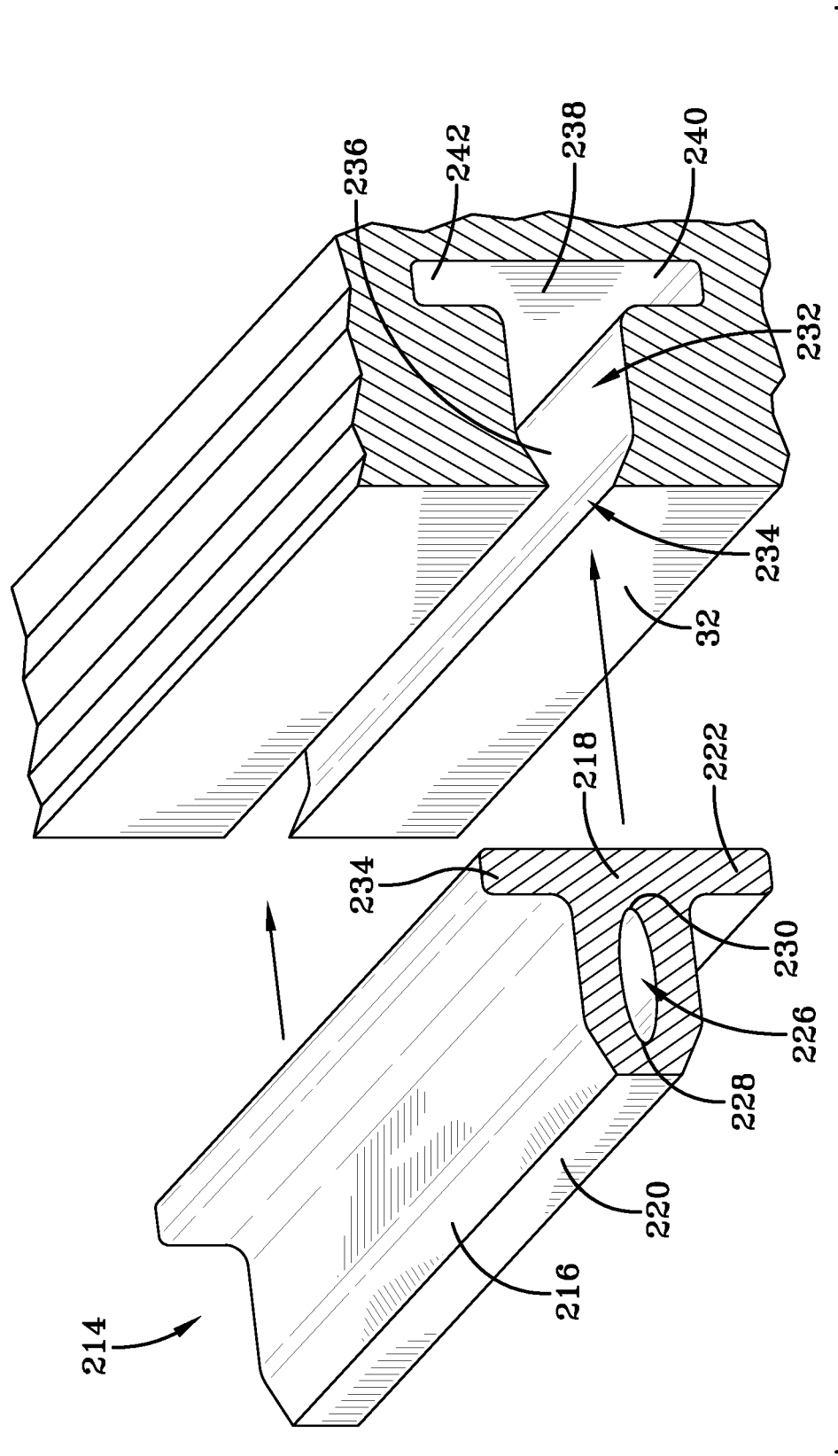
FIG. 19B is an exploded perspective view of a section of the fourth alternative tube embodiment and host sidewall groove.

FIG. 18A is a transverse section view through a tire showing the tube 214 oriented within the groove 232 in a non-collapsed condition outside of a rolling tire footprint. FIG. 18B shows a segment of the tube 214 in a collapsed condition within the groove 232 as the segment reaches a location opposite a rolling tire's footprint. Once the collapsed tube segment is no longer opposite the tire footprint, forces imposed on the tube from the sidewall flexure are removed and the tube segment resumes its original, non-collapsed, configuration shown in FIG. 18A.

The alternative embodiments of the peristaltic tube are utilized to pump air along an internal passageway to a tire cavity. The wing projections of each embodiment deform and fold to accommodate insertion of a tube into a groove, and then snap-in groove pockets to functionally retain the tube within its host sidewall groove without compromising the pumping efficiency of the tube body. Each embodiment is configured having a wedge tube side facing an outward sidewall entryway of the host groove, the wedge side increasing in diameter from the groove entryway inward. At the opposite side each tube configuration, a cap region is defined that extends to an inner end of the host groove. Two oppositely directed wing projections extend longitudinally along the tube body and project outward into cavity side chambers of the host groove. The wing projections are configured differently in each of the alternative embodiments but share the structural trait of oppositely directed wing projections which fold to accommodate tube insertion into a host groove, and snap-in groove side chambers once the tube is seated, thus accomplishing the wing projection purpose of tube retention without degrading tube pumping performance.

Figure 9:
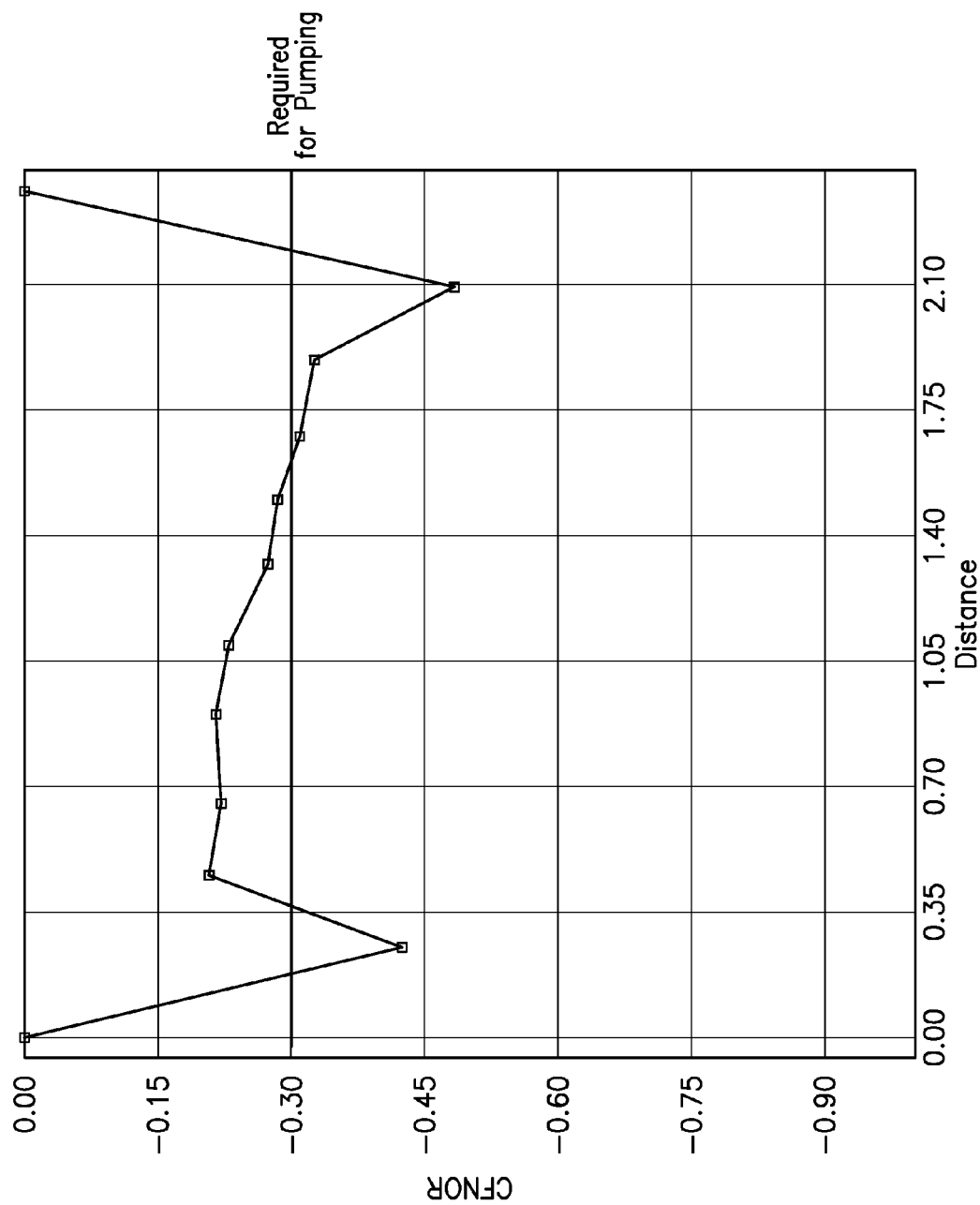
FIG. 9 is a graph of passageway length versus contact force normal for the tube.
Figure 14:
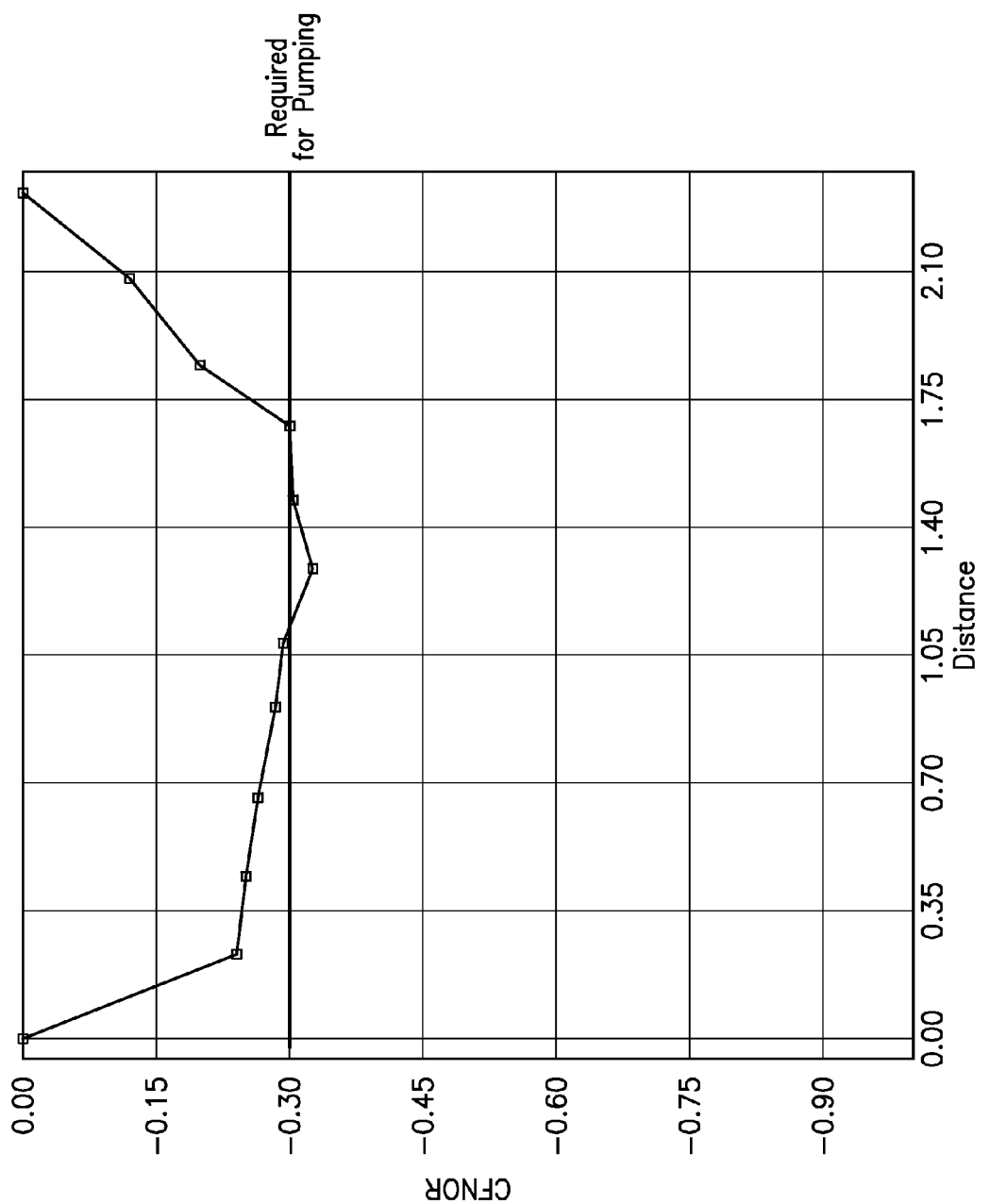
FIG. 14 is a graph of passageway length versus contact force normal for the second alternative tube embodiment.
Figure 17:
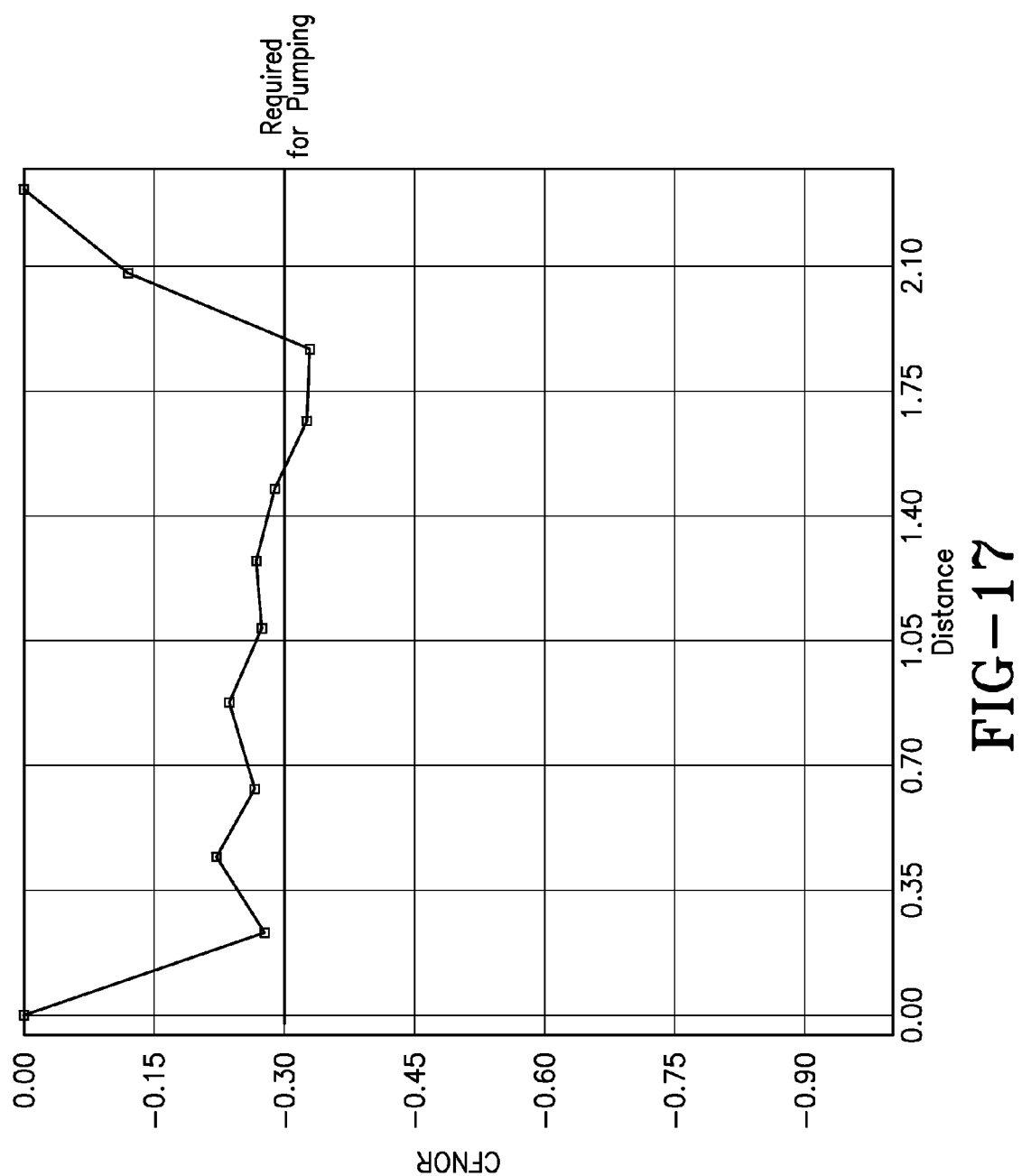
FIG. 17 is a graph of passageway length versus contact force normal for the third alternative tube embodiment.

The performance of each of the tube configurations in providing adequate air pumping along its internal air passageway for given tube passageway sizes may be measured and compared. Such a comparison reveals which tube and wing projection embodiment produces the requisite pressure for pumping air along the passageway for the widest range of passageway sizes while also providing the snap-in retention capability afforded by wing projection configurations. FIG. 20 shows the fishhook tube 112 embodiment within a tire groove of sidewall 32. "X" represents the arc distance from the "start" end of the elliptical passageway 134 to the opposite end, designated "end". The contact pressure between the two opposed halves 244, 246 of the passageway required to collapse the elliptical passageway is CFNOR (Contact Force Normal, or Contact Pressure). In FIGS. 9, 14, and 17, empirical test results are presented, graphing Y-axis CFNOR vs. X-axis sizes of passageway arcs "X" for the "wedge" tube embodiment shown in FIGS. 8A, 8B; the "winged" tube configuration shown in FIGS. 13A, 13B; and the "lobe" tube embodiment shown in FIGS. 16A, 16B, respectively. The required force required for pumping is as indicated by horizontal line as 0.30 CFNOR. It will be noted from the graphs that the sizing of the elliptical passageway selected for the peristaltic tube affects the pressure required to close the tube passageway. Moreover, the pressure required to close the air passageway is affected by the tube configuration employed. Each of the tube configurations described herein were tested to measure the CFNOR force required to collapse the tube passageway for a range of X-sized passageways.

As a result of the comparison, for pure snap-in operation of the alternative tube configurations, the tubes, in order of performance are the "mushroom" tube; the "fish-hook" tube; the "bull-horn" tube; the "fish-tail" tube; and the "side-taper" tube. For peristaltic pumping intent, measuring the pinching force as a metric, the "fish-hook" tube ranked first. In combining both retention capability and pumping efficiency, the "mushroom" and "fish-hook" tube configurations provided the best optimized performance followed by the "fishtail", "taper" and "bull-horn" configurations.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire assembly comprising:
a tire having a tire cavity, a first and a second sidewall extending to a tire tread region;
an elongate sidewall groove extending into the first tire sidewall from an outward first sidewall surface; the sidewall groove having a wedge-shaped transverse sectional profile extending from an axially outer groove entry region of a narrower width dimension at the outward first sidewall surface, to a wider width dimension at an inward groove end within the first tire sidewall;
an elongate air tube positioned within the elongate sidewall groove in at least partial contacting engagement with groove sidewalls defining the sidewall groove, the air tube comprising a unitary air tube body having an internal air passageway substantially centrally positioned within the air tube body; the air tube body having a wedge-shaped transverse sectional profile complementarily positioned within the sidewall groove, the air tube body tapering in width dimension from a wider width at an inward tube end within the first tire sidewall to a narrower width dimension at an outward tube end at the outward first sidewall surface, and
an air tube retention wing projection at the inward tube end seated within the inward groove end for operatively retaining the air tube within the elongate sidewall groove; and wherein the air tube body wing projection comprises extending folding wing projections projecting from at the air tube at the inward tube end, the wing projections seating within groove chambers at the inward groove end.

2. The tire assembly of claim 1, wherein the air tube is formed of resilient material, wherein the air tube is operative to compress responsive to impinging stress forces from internal contact with the tire sidewall against the air tube body, whereby the air tube body reconfigures from an expanded unstressed configuration into a compressed configuration to substantially constrict the air passageway.

3. The tire assembly of claim 2, wherein the air tube is operative to resiliently decompress into the expanded configuration upon reduction of the impinging stress forces.

4. The tire assembly of claim 3, wherein the air tube substantially occupies a volumetric entirety of the sidewall groove.

5. The tire assembly of claim 4, wherein the longitudinal axis of the air passageway extends within the air tube in a position between the wing projections of the air tube body.

6. The tire assembly of claim 4, wherein the wing projections operatively retain the air tube within the sidewall groove.

7. The tire assembly of claim 6, wherein the projecting wing projections are oriented to project outward from the air tube at the air tube inward end and have a geometric form in transverse section including the air tube and the wing projections from the group: mushroom-shaped; fish-hook shaped; fish-tail shaped; side-taper shaped.

8. A tire assembly comprising:
a tire having a tire cavity, a first and a second sidewall extending to a tire tread region;
an elongate air tube positioned within a tire sidewall cavity in at least partial contacting internal engagement with internal surfaces of the tire sidewall, the air tube comprising a unitary air tube body; an internal air passageway elongate along a longitudinal axis substantially centrally positioned within the air tube body;
the air tube body having a wedge portion dimensioned to widen from an outward air tube body surface toward an inward air tube body end; and first and second wing projections positioned at the inward air tube body end and projecting in opposite directions;
the air tube body being formed of resilient material, wherein the air tube body is located within the tire sidewall at a location to operatively compress the air tube body responsive to impinging stress forces from the tire sidewall against the air tube body, whereby the air tube body reconfigures from an expanded unstressed configuration into a compressed configuration to substantially constrict the air passageway; and
wherein the wing projections each comprise a folding wing body operatively folding against the air tube body into a smaller width tube configuration and operatively expanding into an extended tube-retention configuration.

9. The tire assembly of claim 8, wherein the wing projections are oriented to project outward from opposite sides of the air tube body at the air tube body inward end and the air tube has a geometric form in transverse section including the air tube body and the wing projections from the group: mushroom-shaped; fish-hook shaped; fish-tail shaped; side-taper shaped.

10. A method of reconfiguring an air tube body within a tire sidewall, comprising:

positioning an elongate air tube in lateral relationship with a sidewall groove having a central groove chamber and a groove entryway at the tire sidewall; the air tube comprising a unitary air tube body having a wedge-shaped transverse section configuration extending from an outward smaller width end to a larger width inward end within the tire sidewall; an internal air passageway substantially centrally positioned within the air tube body; and the air tube body having flexing wing projections projecting in opposite directions at the inward air tube end;

placing the air tube into a compressed condition and the wing projections into a folded condition, the wing projections in the folded condition fitting within the tire sidewall groove entryway;

inserting the air tube in the compressed condition laterally through the sidewall groove entryway and into the tire sidewall cavity;

placing the air tube in an expanded non-compressed tube configuration within the sidewall groove chamber in at least partial contacting internal engagement with internal surfaces of the tire sidewall;

unfolding the wing projections into complementary configured inward pocket regions of the sidewall groove to operatively retain the air tube body in the sidewall groove;

flexing the tire sidewall to impinge stress forces within the sidewall on the air tube body;

collapsing the air passageway into an at least partially constricted configuration responsive to the impinging stress forces on the air tube body.

11. The method of claim 10, further comprising:

reducing the impinging stress forces on the air tube body;

releasing the air tube body from the constructed configuration to resume the expanded configuration and to place the air passageway into an open configuration.

\* \* \* \* \*